(12) United States Patent
Nakaoka

(10) Patent No.: US 10,107,241 B2
(45) Date of Patent: Oct. 23, 2018

(54) VALVE DEVICE AND HIGH-PRESSURE PUMP USING THE SAME

(71) Applicant: DENSO CORPORATION, Kariya, Aichi-pref. (JP)

(72) Inventor: Masaharu Nakaoka, Kariya (JP)

(73) Assignee: DENSO CORPORATION, Kariya (JP)

( * ) Notice: Subject to any disclaimer, the term of this patent is extended or adjusted under 35 U.S.C. 154(b) by 490 days.

(21) Appl. No.: 14/740,663

(22) Filed: Jun. 16, 2015

(65) Prior Publication Data

US 2015/0361935 A1    Dec. 17, 2015

(30) Foreign Application Priority Data

Jun. 16, 2014  (JP) .................... 2014-123273

(51) Int. Cl.
*F16K 17/196* (2006.01)
*F02M 37/00* (2006.01)
(Continued)

(52) U.S. Cl.
CPC ...... *F02M 37/0023* (2013.01); *F02M 37/043* (2013.01); *F02M 59/102* (2013.01); *F02M 59/464* (2013.01); *F02M 63/0049* (2013.01); *F02M 63/029* (2013.01); *F04B 19/22* (2013.01); *F04B 53/10* (2013.01); *F04B 53/14* (2013.01);
(Continued)

(58) Field of Classification Search
CPC ............. F02M 37/0023; F02M 63/029; F02M 63/0049; F02M 59/464; F02M 59/102; F02M 37/043; F02M 59/366; F02M 2200/315; F02M 63/0043; Y10T 137/7838; Y10T 137/7771; Y10T 137/7779;
(Continued)

(56) References Cited

U.S. PATENT DOCUMENTS

| | | | | | |
|---|---|---|---|---|---|
| 2,945,701 | A | * | 7/1960 | Dietrich | B60G 17/052 137/512 |
| 4,747,475 | A | * | 5/1988 | Hagwood | F16F 9/348 137/493.9 |
| 2012/0222759 | A1 | | 9/2012 | Knis et al. | |
| 2015/0337753 | A1 | * | 11/2015 | Stickler | F02M 57/02 123/506 |

FOREIGN PATENT DOCUMENTS

| | | |
|---|---|---|
| EP | 1 342 912 | 9/2003 |
| JP | 58-46167 | 10/1983 |

(Continued)

*Primary Examiner* — Peter J Bertheaud
*Assistant Examiner* — Dnyanesh Kasture
(74) *Attorney, Agent, or Firm* — Nixon & Vanderhye P.C.

(57) ABSTRACT

A valve device is provided between a high-pressure pump and a fuel tank. A first valve member, an intermediate member and a second valve member are accommodated in a valve housing. The first valve member, which is arranged on a downstream side of the intermediate member, is biased by a first spring in a direction to a first valve seat formed in the intermediate member. The second valve member, which is arranged on an upstream side of the intermediate member, is biased by a second spring in a direction to a second valve seat formed in the intermediate member. When the first valve member is separated from the first valve seat, fuel flows in a forward direction from an upstream-side fuel passage to a downstream-side fuel passage. When the second valve member is separated from the second valve seat, the fuel flows in a reverse direction.

5 Claims, 8 Drawing Sheets

(51) Int. Cl.
  *F02M 37/04*   (2006.01)
  *F04B 19/22*   (2006.01)
  *F04B 53/14*   (2006.01)
  *F04B 53/16*   (2006.01)
  *F04B 53/10*   (2006.01)
  *F02M 63/02*   (2006.01)
  *F02M 63/00*   (2006.01)
  *F02M 59/10*   (2006.01)
  *F02M 59/46*   (2006.01)
  *F02M 59/36*   (2006.01)

(52) U.S. Cl.
  CPC ............ *F04B 53/16* (2013.01); *F16K 17/196* (2013.01); *F02M 59/366* (2013.01); *F02M 2200/315* (2013.01); *Y10T 137/7771* (2015.04)

(58) Field of Classification Search
  CPC ...... Y10T 137/778; F04B 53/10; F04B 53/16; F04B 53/14; F04B 19/22; F16K 17/196
  See application file for complete search history.

(56) References Cited

FOREIGN PATENT DOCUMENTS

| | | |
|---|---|---|
| JP | 62-16028 | 1/1987 |
| JP | 02-122281 | 10/1990 |
| JP | 04-209962 | 7/1992 |
| JP | 06-300150 | 10/1994 |
| JP | 2006-504903 | 2/2006 |

\* cited by examiner

1

VALVE DEVICE AND HIGH-PRESSURE PUMP USING THE SAME

CROSS REFERENCE TO RELATED APPLICATION

This application is based on Japanese Patent Application No. 2014-123273 filed on Jun. 16, 2014, the disclosure of which is incorporated herein by reference.

FIELD OF TECHNOLOGY

The present disclosure relates to a valve device and a high pressure pump using the valve device.

BACKGROUND

A fuel supply system for a vehicle is known in the art, according to which the fuel supply system has a low-pressure pump and a high-pressure pump. In such a fuel supply system, fuel stored in a fuel tank is pressurized by the low-pressure pump to a relatively low pressure and then low-pressure fuel is further pressurized by the high-pressure pump to a relatively high pressure. In addition, high-pressure fuel is injected into a cylinder of an engine by a high-pressure injection valve, while the low-pressure fuel is also injected into the cylinder by a low-pressure injection valve. In this fuel supply system, a branch-off portion is provided in a connecting pipe, which connects the low-pressure pump to the high-pressure pump, in order to supply the low-pressure fuel flowing in the connecting pipe to the low-pressure injection valve.

In the fuel supply system of this kind, the fuel flowing through the connecting pipe is sucked into an inside of the high-pressure pump, in order that the fuel is pressurized by the high-pressure pump to the relatively high pressure. As a result, fuel pressure in the connecting pipe temporarily becomes lower than the fuel pressure pumped out by the low-pressure pump. On the other hand, a part of the fuel sucked into the high-pressure pump is pushed back into the connecting pipe, when the high-pressure pump controls fuel pressure and/or fuel amount to be pumped out therefrom. Accordingly, the fuel pressure is largely changed in the connecting pipe. Vibration may be generated in the connecting pipe by the change of the fuel pressure.

A fuel supply system, for example, as disclosed in Japanese Patent Publication No. 2006-504903 (=WO 2004/040127), has a valve device, which allows a fuel flow in a forward direction from a low-pressure pump to a low-pressure accumulator and which further allows a fuel flow in a reverse direction from the low-pressure accumulator back into a connecting pipe provided between the low-pressure pump and a high-pressure pump when fuel pressure inside of the low-pressure accumulator becomes higher than a predetermined value.

In the valve device of the fuel supply system according to the above Patent Publication, a first valve member is provided for allowing the fuel flow in the forward direction and a second valve member is provided for allowing the fuel flow in the reverse direction. In addition, a first spring is provided in order to bias the first valve member in a direction to the connecting pipe and a second spring is provided in order to bias the second valve member in a direction to the low-pressure accumulator. The second spring is arranged in the valve device on a side to the connecting pipe provided between the low-pressure pump and the high-pressure pump.

2

According to the above valve device, the first spring and the second spring are coaxially arranged in a valve housing on a center axis of the valve device, so that the first spring and the second spring are partly overlapped with each other in a radial direction of the valve housing. As a result, a size of the valve housing in the radial direction is large. In addition, a second valve seat, with which the second valve member is operatively brought into contact, is formed in the first valve member. Therefore, a shape of the first valve member is complicated. A manufacturing cost thereof becomes thereby higher.

SUMMARY OF THE DISCLOSURE

The present disclosure is made in view of the above problem. It is an object of the present disclosure to provide a valve device, which can suppress vibration caused by pressure fluctuation and a size of which can be reduced.

According to a feature of the present disclosure, a valve device has a valve housing, an intermediate member, a forward-flow allowing unit, a reverse-flow allowing unit and so on.

The intermediate member is accommodated in the valve housing. The forward-flow allowing unit is arranged in the valve housing on a downstream side of the intermediate member and allows fuel flow in a forward direction from an upstream-side of the valve housing to a downstream-side of the valve housing when fuel pressure in the upstream-side becomes higher than a first predetermined value. The reverse-flow allowing unit is arranged in the valve housing and allows fuel flow in a reverse direction from the downstream-side of the valve housing to the upstream-side of the valve housing when fuel pressure in the downstream side becomes higher than a second predetermined value.

The forward-flow allowing unit is composed of a first valve member, which is operatively brought into contact with a first valve seat formed in the intermediate member, and a first biasing member for biasing the first valve member in a direction to the first valve seat. The reverse-flow allowing unit is arranged in the valve housing on an upstream-side of the intermediate member, or the reverse-flow allowing unit is formed in the first valve member or in the intermediate member on a center axis of the valve housing, or the reverse-flow allowing unit is formed on an upstream-side valve surface of the first valve member.

In the above valve device of the present disclosure, as explained above, the forward-flow allowing unit is composed of the first valve member, which is operatively brought into contact with the first valve seat formed in the intermediate member, and the first biasing member for biasing the first valve member in the direction to the first valve seat. And the first valve member is separated from the first valve seat, when the fuel pressure in the upstream-side of the valve housing becomes higher than the first predetermined value, so that the fuel flows from the upstream side of the valve housing to the downstream side of the valve housing.

In addition, the valve device of the present disclosure has the reverse-flow allowing unit, which allows the fuel flow from the downstream-side to the upstream side of the valve housing when the fuel pressure in the downstream side becomes higher than the second predetermined value. According to the above operation, fluctuation of the fuel pressure in the upstream side of the valve housing can be made smaller and thereby vibration of the fuel supply system due to the fluctuation of the fuel pressure can be reduced.

According to the valve device of the present disclosure, the reverse-flow allowing unit is arranged in the valve housing on the upstream-side of the intermediate member, or the reverse-flow allowing unit is formed in the first valve member or in the intermediate member on the center axis of the valve housing, or the reverse-flow allowing unit is formed on the upstream-side valve surface of the first valve member. According to such a structure, it becomes unnecessary to provide an axial space in the valve device, in which the forward-flow allowing unit and the reverse-flow allowing unit are overlapped in the radial direction of the valve housing. As a result, it becomes possible to reduce a size of the valve device in the radial direction.

BRIEF DESCRIPTION OF THE DRAWINGS

The above and other objects, features and advantages of the present disclosure will become more apparent from the following detailed description made with reference to the accompanying drawings. In the drawings:

FIGS. 4A and 4B show an intermediate member of the valve device, wherein FIG. 4A is a schematic front view when viewed in a direction of an arrow IVA in FIG. 4B, while FIG. 4B is a schematic cross sectional view taken along a line IVB-IVB in FIG. 4A;

FIGS. 5A and 5B show a first valve holder of the valve device, wherein FIG. 5A is a schematic front view when viewed in a direction of an arrow VA in FIG. 5B, while FIG. 5B is a schematic cross sectional view taken along a line VB-VB in FIG. 5A;

DETAILED DESCRIPTION OF THE EMBODIMENTS

Figure 1:
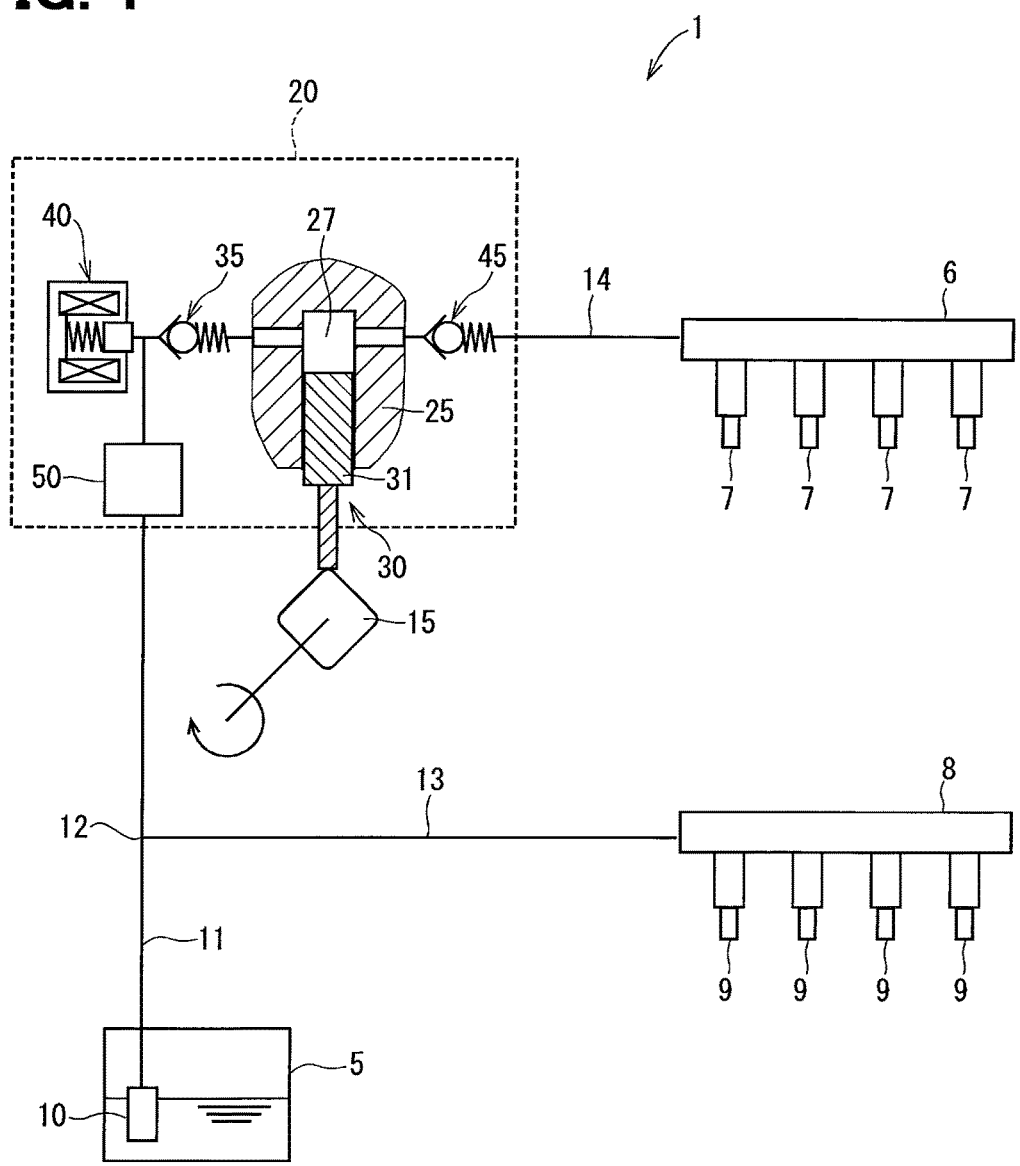
FIG. 1 is a schematic diagram showing a fuel supply system, to which a high-pressure pump having a valve device of a first embodiment of the present disclosure is applied.

The present disclosure will be explained hereinafter by way of multiple embodiments with reference to the drawings. The same reference numerals are given to the same or similar structure and/or portion in order to avoid repeated explanation.

First Embodiment

At first, a fuel supply system 1, to which a high-pressure pump having a valve device of a first embodiment of the present disclosure is applied, will be explained.

In the fuel supply system 1, fuel is pumped up by a low-pressure pump 10 from a fuel tank 5 and low-pressure fuel pumped out from the low-pressure pump 10 is divided into two groups. One group of the low-pressure fuel is supplied to low-pressure fuel injectors 9, so that relatively low-pressure fuel is supplied from the low-pressure fuel injectors 9 into combustion chambers (not shown) of an internal combustion engine (hereinafter, the engine). The other group of the low-pressure fuel is supplied to high-pressure fuel injectors 7 via a high-pressure pump 20, so that the fuel of relatively high-pressure is injected from the high-pressure fuel injectors 7 into the combustion chambers of the engine. The high-pressure pump 20 for pressurizing the low-pressure fuel from the low-pressure pump 10 and a high-pressure fuel rail 6 for accumulating the high-pressure fuel are provided between the low-pressure pump 10 and the high-pressure fuel injectors 7. A low-pressure fuel rail 8 for accumulating the low-pressure fuel is provided between the low-pressure pump 10 and the low-pressure fuel injectors 9.

The low-pressure pump 10 is located inside of the fuel tank 5. The low-pressure pump 10 sucks the fuel in the fuel tank 5 and pressurizes the fuel to such a fuel pressure, under which the fuel can be injected from the low-pressure fuel injectors 9. The pressurized fuel flows through a fuel passage 111 (FIG. 2) formed in a connecting pipe 11, which connects the low-pressure pump 10 to the high-pressure pump 20.

A branch-off portion 12 is formed in the connecting pipe 11. The branch-off portion 12 is connected to the low-pressure fuel rail 8 via a low-pressure connecting pipe 13. The fuel passing through the fuel passage 111 of the connecting pipe 11 is divided into two groups at the branch-off portion 12. One group of the fuel is a fuel flow to the high-pressure pump 20 and the other group of the fuel is a fuel flow to the low-pressure fuel rail 8. The fuel flowing to the low-pressure fuel rail 8 is accumulated in the low-pressure fuel rail 8. The fuel accumulated in the low-pressure fuel rail 8 is injected from the low-pressure fuel injectors 9 in accordance with command signals from a control unit (not shown).

The high-pressure pump 20 pressurizes the fuel from the fuel passage 111 of the connecting pipe 11 to such a fuel pressure, under which the high-pressure fuel can be injected from the high-pressure fuel injectors 7. The pressurized fuel passes through a high-pressure connecting pipe 14, which connects the high-pressure pump 20 to the high-pressure fuel rail 6. A detailed structure of the high-pressure pump 20 will be explained below.

The high-pressure fuel rail 6 accumulates the high-pressure fuel pressurized by the high-pressure pump 20. The fuel accumulated in the high-pressure fuel rail 6 is injected from the high-pressure fuel injectors 7 in accordance with command signals from the control unit (not shown).

Figure 2:
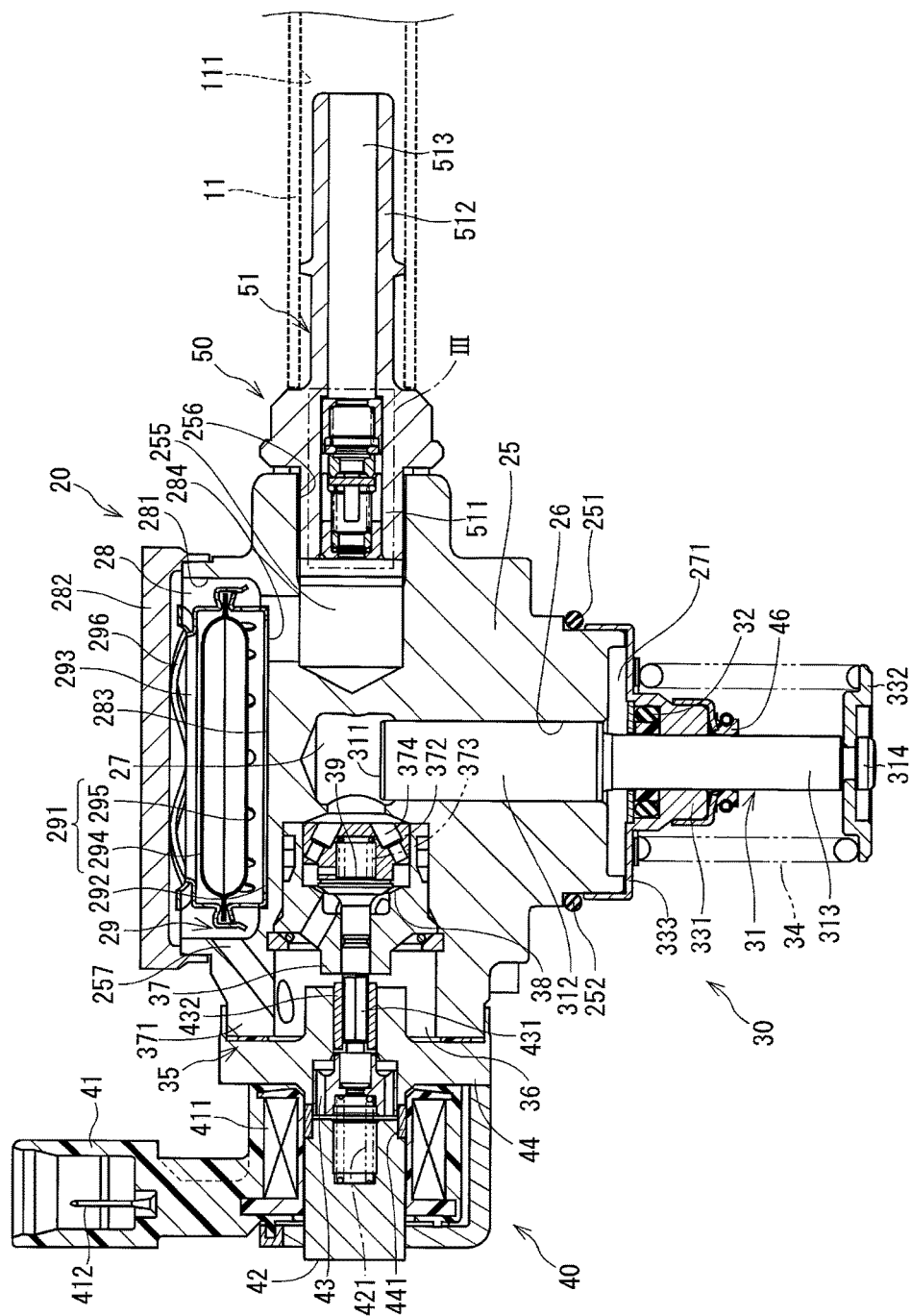
FIG. 2 is a schematic cross sectional view showing the high-pressure pump having the valve device of the first embodiment.

The structure of the high-pressure pump 20 will be explained with reference to FIGS. 1 and 2. As shown in FIG. 2, the high-pressure pump 20 is composed of a pump body 25 as a main body portion, a plunger portion 30, a check-valve portion 50 as a valve device, an intake valve portion 35 as a pressure control portion, an electromagnetic driving portion 40, a discharge valve portion 45 (FIG. 1) and so on.

The pump body 25 is made of, for example, metal and forms an outer frame of the high-pressure pump 20. The pump body 25 has a cylinder 26. A plunger 31 is movably accommodated in the cylinder 26, so that the plunger 31 is capable of reciprocating in the cylinder 26. An inner peripheral wall for the cylinder 26 of the pump body 25 forms a fuel pressurizing chamber 27 together with an axial end surface 311 of the plunger 31. The axial end surface 311 is formed at an upper-side axial end of the plunger 31, which is inserted into the cylinder 26. The fuel pressurizing chamber 27 pressurizes the fuel to the relatively high fuel pressure.

A sub fuel chamber 271 is formed at a lower end of the pump body 25, from which the plunger 31 is inserted into the cylinder 26. The sub fuel chamber 271 is recessed in a direction toward the fuel pressurizing chamber 27. A fuel leaked from the fuel pressurizing chamber 27 through a sliding gap between the cylinder 26 and the plunger 31 is pooled in the sub fuel chamber 271.

A main fuel chamber 28 is formed between a recessed portion 281 at an upper side of the pump body 25 and a cover member 282 for covering an open end of the recessed portion 281. The fuel, which passes through the check valve portion 50 (explained below), is supplied into the main fuel chamber 28. A communication fuel passage (not shown) is formed in the pump body 25 for communicating the main fuel chamber 28 and the sub fuel chamber 271 with each other. The communication fuel passage formed in the pump body 25 extends in a direction parallel to an axial direction of the plunger 31.

A damper unit 29 is arranged in the main fuel chamber 28. The damper unit 29 is composed of a pulsation damper 291, a bottom-side supporting member 292 provided at a bottom of the recessed portion 281, a cover-side supporting member 293 provided on a side of the cover member 282.

The pulsation damper 291 is composed of a pair of diaphragms 294 and 295 and gas of a predetermined pressure is sealed in an inside thereof. Pulsation of fuel pressure in the main fuel chamber 28 is reduced by elastic deformation of the diaphragms 294 and 295 depending on pressure change in the main fuel chamber 28.

A concave portion 283 is formed at the bottom of the recessed portion 281 of the main fuel chamber 28 so as to position the bottom-side supporting member 292. An opening 284 is formed in the concave portion 283, so that the fuel flows into the main fuel chamber 28 from the fuel passage 111. A plate spring 296 of a wave shape, which is arranged on an upper side of the cover-side supporting member 293, pushes the cover-side supporting member 293 in a direction to the bottom-side supporting member 292, when the cover member 282 is attached to the pump body 25.

A stepped portion 251 is formed in the pump body 25 on a side of the plunger portion 30. An O-ring 252 is provided at the stepped portion 251. When the high-pressure pump 20 is fixed to an insertion hole of the engine (not shown), the O-ring 252 is brought into contact with an inner peripheral wall of the insertion hole.

The plunger portion 30 is composed of the plunger 31, a fuel sealing member 32, an upper sheet 331, a lower sheet 332, a plunger spring 34 and so on.

The plunger 31 has a large-diameter portion 312 on a side to the fuel pressurizing chamber 27, so that the large-diameter portion 312 is reciprocated along the inner peripheral wall of the cylinder 26. The plunger 31 has a small-diameter portion 313 on an opposite side to the fuel pressurizing chamber 27. The large-diameter portion 312 and the small-diameter portion 313 are coaxially formed with each other. The lower sheet 332 is attached to an axial end of the plunger 31 (a driving end portion 314), which is on a side opposite to a connecting portion between the large-diameter portion 312 and the small-diameter portion 313.

The fuel sealing member 32 is provided so as to surround an outer peripheral wall of the small-diameter portion 313. An upper portion of the small-diameter portion 313, which is above the fuel sealing member 32, is exposed to the sub fuel chamber 271. A volume of the sub fuel chamber 271 is changed in accordance with a reciprocal movement of the plunger 31 by such a volume capacity, which is obtained by multiplying a difference of a cross-sectional area between the large-diameter portion 312 and the small-diameter portion 313 by a stroke of the plunger 31. The fuel sealing member 32 is composed of an inside ring and an outside O-ring. The inside ring is in a sliding contact with the outer peripheral wall of the small-diameter portion 313. The fuel sealing member 32 restricts a thickness of an oil film of the fuel around the small-diameter portion 313, to thereby prevent the fuel from leaking to a side of the engine due to the reciprocating movement of the plunger 31.

The upper sheet 331 is made by, for example, a press work. The upper sheet 331 is fixed to an outer wall of the pump body 25 by, for example, welding. The upper sheet 331 supports one end of the plunger spring 34.

The fuel sealing member 32 is accommodated in an inside of the upper sheet 331. An oil sealing member 46 is attached to a lower side of the upper sheet 331 so as to surround the outer peripheral wall of the small-diameter portion 313. The oil sealing member 46 restricts a thickness of an oil film of lubricating oil around the small-diameter portion 313, to thereby prevent the oil from leaking due to the reciprocating movement of the plunger 31.

The lower sheet 332 is fixed to the driving end portion 314 of the plunger 31. The lower sheet 332 supports the other end of the plunger spring 34. The plunger spring 34 works as a returning spring for the plunger 31 so as to bias the plunger 31 toward a cam member 15 (shown in FIG. 1), that is, in a downward direction in FIG. 2.

The plunger 31 is reciprocated in the inside of the pump body 25 depending on a profile of the cam member 15. The volume of the fuel pressurizing chamber 27 is changed in accordance with the reciprocal movement of the plunger 31, so that the fuel is sucked into the fuel pressurizing chamber 27 and pressurized.

The check valve portion 50 is provided in the pump body 25 in a direction almost perpendicular to the axial direction of the plunger 31 (that is, a reciprocating direction of the plunger 31). One of axial ends of the check valve portion 50 (that is, a left-hand axial end in FIG. 2) is fixed to an inner wall of a fuel supply passage 255 formed in the pump body 25. The other axial end of the check valve portion 50 (a right-hand axial end) is connected to the connecting pipe 11. The check valve portion 50 allows fuel flow in a forward direction from the fuel passage 111 to the fuel supply passage 255, while the check valve portion 50 also allows fuel flow in a reverse direction from the fuel supply passage 255 to the fuel passage 111 when a fuel pressure in the fuel supply passage 255 becomes larger than a predetermined value. A detailed structure and operation of the check valve portion 50 will be explained below.

The intake valve portion 35 is composed of a fuel supply chamber 36, a valve body 37, a seat portion 38, an intake valve 39 and so on.

The valve body 37 is accommodated in the fuel supply chamber 36, which is formed in a cylindrical portion 371 of the pump body 25. The seat portion 38, which has an inner peripheral surface of a concave-tapered shape, is formed in an inside of the valve body 37. The intake valve 39 is arranged in the valve body 37 at a position facing to the seat portion 38 formed in the valve body 37. The intake valve 39 is movably supported and guided by an inner peripheral wall of a hole formed in a bottom portion of the valve body 37, so that the intake valve 39 is capable of reciprocating in the valve body 37 (in a horizontal direction in FIG. 2). The fuel supply chamber 36 is opened and communicated to the fuel pressurizing chamber 27 when the intake valve 39 is separated from the seat portion 38, while the fuel supply chamber 36 is closed and communication between the fuel supply chamber 36 and the fuel pressurizing chamber 27 is blocked off when the intake valve 39 is brought into contact with the seat portion 38.

A stopper member 372, which is fixed to the inner peripheral wall of the valve body 37, restricts a movement of the intake valve 39 in a valve opening direction (in a right-hand direction in FIG. 2). A spring 373, which is located between an inside of the stopper member 372 and an axial end of the intake valve 39, biases the intake valve 39 in a valve closing direction (in a left-hand direction in FIG. 2). Multiple inclined passages 374, which are inclined with respect to an axial direction of the stopper member 372, are formed in the stopper member 372 in a circumferential direction thereof. The fuel, which flows from the main fuel chamber 28 into the fuel supply chamber 36 via a suction side fuel passage 257, is sucked into the fuel pressurizing chamber 27 through the inclined passages 374, when the intake valve 39 is opened.

The electromagnetic driving portion 40 is composed of a connector 41, a fixed core 42, a movable core 43, a flange 44 and so on.

The connector 41 has a coil 411 and a terminal 412. The coil 411 generates an electromagnetic field when electric power is supplied to the coil 411 via the terminal 412. The fixed core 42 is made of magnetic material and accommodated inside of the coil 411. The movable core 43 is made of magnetic material and located at a position axially opposing to the fixed core 42. The movable core 43 is movably accommodated inside of the flange 44, so that the movable core 43 is capable of reciprocating in an axial direction of the coil 411.

The flange 44 is made of magnetic material and fixed to the cylindrical portion 371 of the pump body 25. The flange 44 holds the connector 41 to the pump body 25 and closes an axial open end of the cylindrical portion 371. A cylindrical guide member 432 is provided at an inner wall of a through-hole, which is formed at a center of the flange 44. A tubular member 441 made of non-magnetic material is provided between the fixed core 42 and the flange 44 in order to prevent short-circuit of magnetic flux between them.

A needle 431, which is made in a cylindrical shape, is guided by an inner wall of the cylindrical guide member 432 so as to be reciprocated within the cylindrical guide member 432. One of axial ends of the needle 431 (a left-hand end) is fixed to the movable core 43, while the other axial end (a right-hand end) is brought into contact with the axial end of the intake valve 39 (a left-hand axial end) on a side to the electromagnetic driving portion 40.

A spring 421 is provided between the fixed core 42 and the movable core 43. The spring 421 biases the movable core 43 in the valve opening direction of the intake valve 39, wherein a biasing force of the spring 421 is larger than a biasing force of the spring 373 which biases the intake valve 39 in the valve closing direction.

When no electric power is supplied to the coil 411, the needle 431 integrally connected to the movable core 43 is moved by the biasing force of the spring 421 in the direction to the intake valve 39. The axial end of the needle 431 (that is, the right-hand end) pushes the intake valve 39 in the right-hand direction, to thereby open the intake valve 39.

The discharge valve portion 45 (FIG. 1) is provided in the pump body 25 at a position different from those for the intake valve portion 35 and the check valve portion 50. The discharge valve portion 45 has an inside portion communicated to the fuel pressurizing chamber 27. The discharge valve portion 45 is opened, when the fuel pressure in the fuel pressurizing chamber 27 is increased in accordance with an upward movement of the plunger 31 and the fuel pressure becomes higher than a predetermined value. Then, the fuel is discharged from the fuel pressurizing chamber 27 into an inside of the high-pressure connecting pipe 14. On the other hand, the discharge valve portion 45 is closed, when the fuel pressure in the fuel pressurizing chamber 27 is decreased in accordance with a downward movement of the plunger 31 and the fuel pressure becomes lower than a predetermined value. Then, the fuel pressurizing chamber 27 is blocked off from the inside of the high-pressure connecting pipe 14. According to the above operation, a reverse flow of the high-pressure fuel from the high-pressure connecting pipe 14 to the fuel pressurizing chamber 27 is prevented.

A structure of the check valve portion 50 (hereinafter, the valve device) will be explained with reference to FIGS. 3 to 5.

The valve device 50 is composed of a valve housing 51, an intermediate member 52, a first valve member 53, a first spring 54, a second valve member 55, a second spring 56, a first filter 57, a second filter 58 and so on. The first valve member 53 and the first spring 54 are collectively referred to as a forward-flow allowing unit. In a similar manner, the second valve member 55 and the second spring 56 are collectively referred to as a reverse-flow allowing unit.

The valve housing 51 is made of metal and formed in an almost cylindrical shape. A left-hand side end portion 511 (hereinafter, a downstream-side passage portion) of the valve housing 51 is fixed to an inner wall 256 of the fuel supply passage 255 formed in the pump body 25, for example, by a press-fitting process (shown in FIG. 2). The fuel supply passage 255 is hereinafter referred to as a downstream-side fuel passage. The valve housing 51 has a through-hole extending in a direction of a center axis CA50 of the valve housing 51. An inner diameter of the through-hole formed in the downstream-side passage portion 511 is larger than an inner diameter of the through-hole formed in a right-hand side end portion 512 (hereinafter, an upstream-side passage portion). The intermediate member 52, the first valve member 53, the first spring 54 (a first biasing member), the second valve member 55, the second spring 56 (a second biasing member), the first filter 57, the second filter 58 and so on are accommodated in the downstream-side passage portion 511 of the valve housing 51. The upstream-side passage portion 512 of the valve housing 51 is connected to the connecting pipe 11 (FIG. 2). An upstream-side fuel passage 513, which is communicated to the fuel passage 111 of the connecting pipe 11, is formed in the upstream-side passage portion 512 of the valve housing 51.

The intermediate member 52 is formed in an almost cylindrical shape and fixed to an inner wall 514 of the through-hole formed in the downstream-side passage portion 511 of the valve housing 51. The intermediate member 52 has a first passage portion 521 extending in the direction of the center axis CA50. The intermediate member 52 has a first and a second peripheral side portions at both axial ends thereof, each surrounding each of opening ends of the first passage portion 521. A first valve seat 522, with which or from which the first valve member 53 is operatively brought into contact or separated, is formed at the first peripheral side portion of the intermediate member 52 (on a left-hand axial end). A second valve seat 523, with which or from which the second valve member 55 is operatively brought into contact or separated, is formed at the second peripheral side portion of the intermediate member 52 (on a right-hand axial end).

Figure 3:
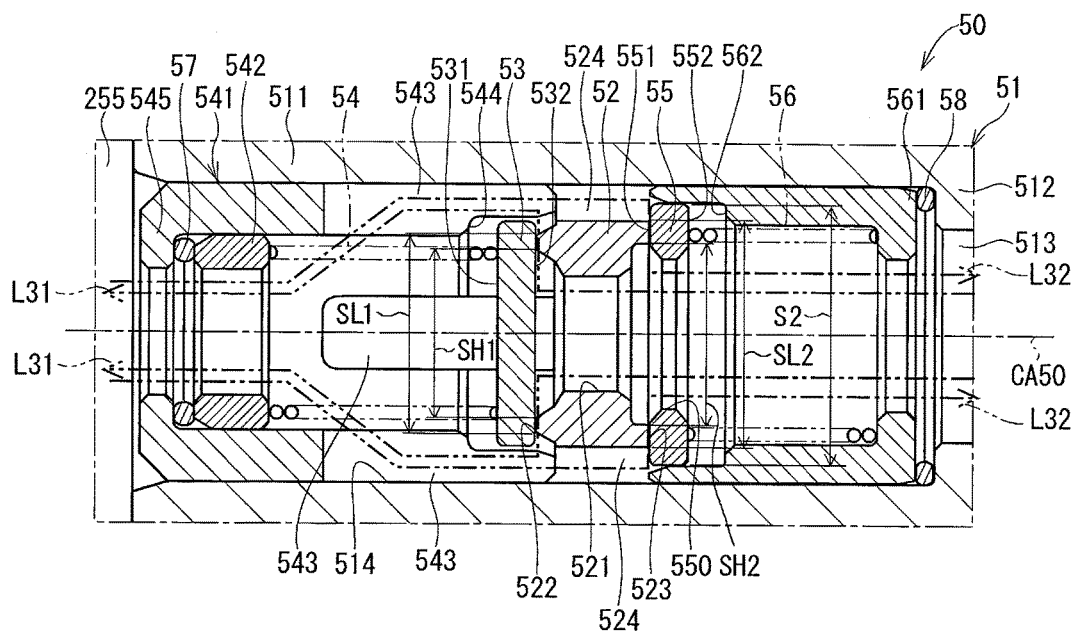
FIG. 3 is a schematically enlarged cross sectional view showing the valve device of the first embodiment.
Figure 4A:
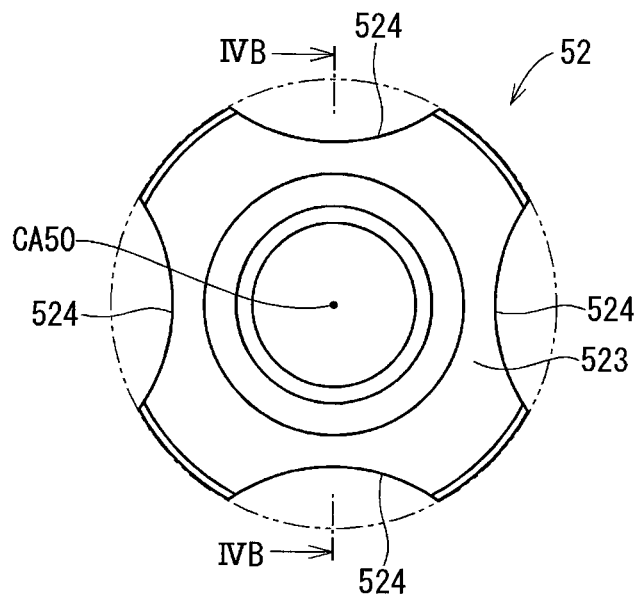
Figure 4B:
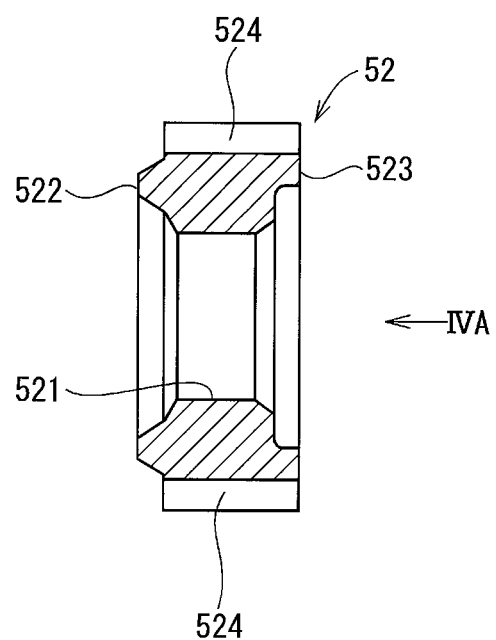

As shown in FIGS. 3, 4A and 4B, the intermediate member 52 has four notched portions 524 at a radial outer periphery thereof. The notched portion 524 is also referred to as a first groove. As shown in FIG. 4A, the notched portions 524 are formed in a circumferential direction at equal intervals (at 90 degrees with respect to the center axis CA50 of the valve housing 51). Each of radial outer peripheral portions of the intermediate member 52, at which the notched portions 524 are not formed, is in contact with the inner wall 514 of the valve housing 51. A gap is formed between each of the notched portions 524 and the inner wall 514. The fuel passes through the gaps, when the fuel flows in a reverse direction from the downstream-side fuel passage 255, which is formed on the left-hand axial end of the valve housing 51, to the connecting passage 111, which is formed on the right-hand axial end of the valve housing 51.

The first valve member 53 is formed in a disc shape and arranged on a side of the first peripheral side portion of the intermediate member 52 (that is, on the left-hand axial end of the intermediate member 52 facing to the downstream-side fuel passage 255). The first valve member 53 is movably accommodated in a first valve holder 541 accommodated in the valve housing 51, so that the first valve member 53 is reciprocal with respect to the first valve holder 541 fixed to the inner wall 514 of the valve housing 51. A right-hand end of the first spring 54 is in contact with a left-hand valve surface 531 of the first valve member 53. A right-hand valve surface 532 of the first valve member 53 is operatively brought into contact with or separated from the first valve seat 522. An outer diameter of the first valve member 53 is smaller than that of the second valve member 55. The right-hand valve surface 532 is also referred to as "an upstream-side valve surface".

A left-hand end of the first spring 54 is in contact with a filter stopper 542, which is accommodated in a left-hand end portion 545 of the first valve holder 541 on a side opposite to the intermediate member 52. As already explained above, the right-hand end of the first spring 54 is in contact with the left-hand valve surface 531 of the first valve member 53. The first spring 54 biases the first valve member 53 in a right-hand direction, that is, in a valve closing direction of the first valve member 53, so that the first valve member 53 is brought into contact with the first valve seat 522 of the intermediate member 52.

Figure 5A:
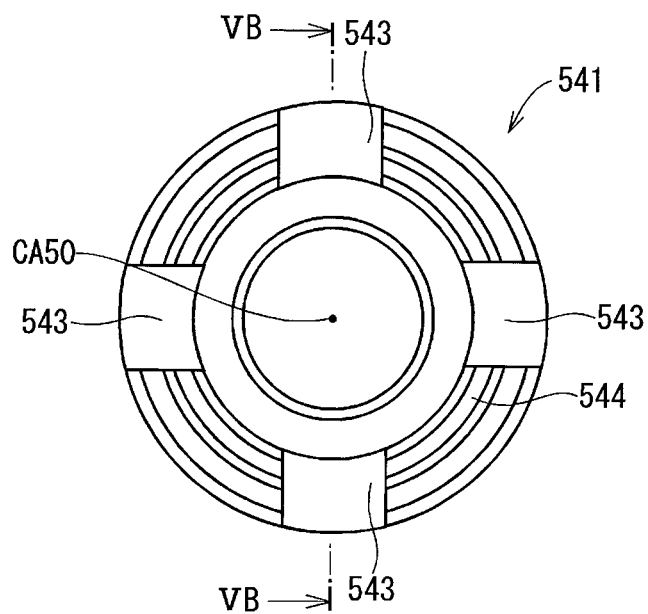
Figure 5B:
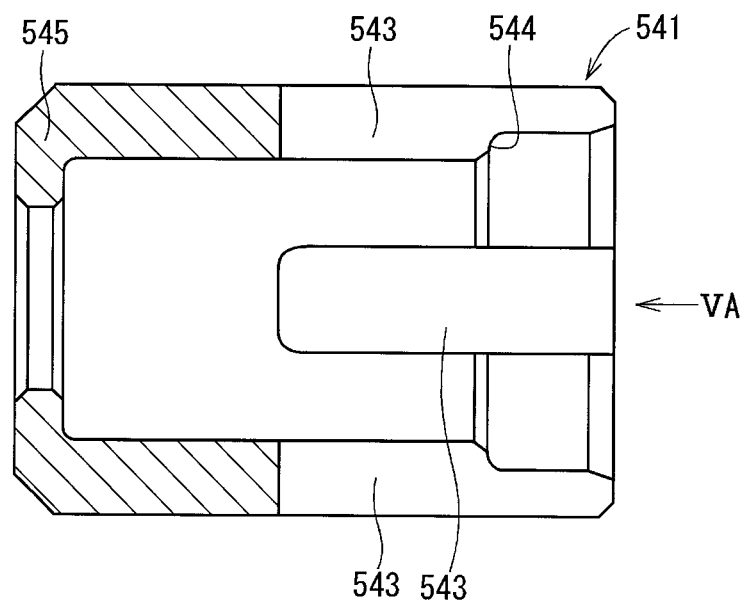

As shown in FIGS. 5A and 5B, the first valve holder 541 is formed in a cylindrical shape. The first filter 57 and the filter stopper 542 are arranged inside of the left-hand end portion 545 of the first valve holder 541 (FIG. 3). Multiple notched portions 543 are formed in a right-hand end portion of the first valve holder 541 on a side to the intermediate member 52. More exactly, the four notched portions 543 (also referred to as the second grooves) are formed in the right-hand end portion of the first valve holder 541 at equal intervals in a circumferential direction of the first valve holder 541. When the first valve holder 541 and the intermediate member 52 are assembled in the valve housing 51, as shown in FIG. 3, each of the notched portions 543 (each second groove 543) and each of the notched portions 524 (each first groove 524) of the intermediate member 52 are aligned with each other in the direction parallel to the center axis CA50. A gap formed between each of the notched portions 543 and the inner wall 514 of the valve housing 51 and a space formed in each of the notched portions 543 form a fluid passage, through which the fuel passes when the fuel flows in a forward direction from the upstream-side fuel passage 513 to the downstream-side fuel passage 255 or in the reverse direction from the downstream-side fuel passage 255 to the upstream-side fuel passage 513.

Multiple (four) stepped portions 544 are formed in the right-hand end portion of the first valve holder 541 on the side to the intermediate member 52. The stepped portions 544 restrict a movement of the first valve member 53 in a left-hand direction, that is, in a direction away from the intermediate member 52. The first valve holder 541 guides the reciprocal movement of the first valve member 53 as well as expansion and contraction of the first spring 54.

As shown in FIG. 3, the second valve member 55 is formed in a ring shape. The second valve member 55 has a second passage portion 550 extending in the direction of the center axis CA50. The second valve member 55 is arranged on a side of the second peripheral side portion of the intermediate member 52 (that is, on the right-hand side of the intermediate member 52 opposite to the first peripheral side portion and facing to the connecting passage 111). The second valve member 55 is movably accommodated in the valve housing 51, more exactly in a second valve holder 561, so that the second valve member 55 is reciprocal with respect to the second valve holder 561 fixed to the inner wall 514 of the valve housing 51. A left-hand valve surface 551 of the second valve member 55 is operatively brought into contact with or separated from the second valve seat 523 formed in the intermediate member 52. A left-hand end of the second spring 56 is in contact with a right-hand valve surface 552 of the second valve member 55.

The second spring 56 is provided in the second valve holder 561. As explained above, the left-hand end of the second spring 56 is in contact with the right-hand valve surface 552 of the second valve member 55. A right-hand end of the second spring 56 is in contact with the second valve holder 561. The second spring 56 biases the second valve member 55 in a left-hand direction, that is, in a valve closing direction of the second valve member 55, so that the second valve member 55 is pushed to the second valve seat 523 of the intermediate member 52.

The second valve holder 561 is formed in a cylindrical shape. A stepped portion 562 is formed in a left-hand end portion of the second valve holder 561, that is, on a side to the intermediate member 52. The stepped portion 562 restricts a movement of the second valve member 55 in a direction toward the connecting pipe 11 (in a right-hand direction). The second valve holder 561 guides the reciprocal movement of the second valve member 55 as well as expansion and contraction of the second spring 56.

The first filter 57 is arranged between the left-hand end portion 545 of the first valve holder 541 and the filter stopper 542. The first filter 57 removes extraneous material contained in the fuel flowing through the valve device 50.

The second filter 58 is arranged between the valve housing 51 and a right-hand end portion of the second valve holder 561. The second filter 58 likewise removes extraneous material contained in the fuel flowing through the valve device 50.

According to the valve device 50 of the present embodiment, a condition for the fuel flow in the forward direction from the upstream-side fuel passage 513 to the downstream-side fuel passage 255 is decided based on fuel pressure in the upstream-side fuel passage 513, fuel pressure in the downstream-side fuel passage 255, a biasing force of the first spring 54 and pressure receiving areas on the left-hand and the right-hand valve surfaces 531 and 532 of the first valve member 53.

More exactly, the first valve member 53 is separated from the first valve seat 522 of the intermediate member 52, when the following first equation (1) is satisfied:

$$PH \cdot SL1 + F1 < PL \cdot SH1 \qquad (1)$$

In the above equation (1), "PL" is the fuel pressure in the upstream-side fuel passage 513; "PH" is the fuel pressure in the downstream-side fuel passage 255; "F1" is the biasing force of the first spring 54; "SL1" is a pressure receiving area formed on the left-hand valve surface 531 of the first valve member 53, which receives the fuel pressure "PH" of the downstream-side fuel passage 255 in the right-hand direction; and "SH1" is a pressure receiving area formed on the right-hand valve surface 532 of the first valve member 53, which receives the fuel pressure "PL" of the upstream-side fuel passage 513 in the left-hand direction when the first valve member 53 is in contact with the first valve seat 522.

Namely, the pressure receiving area "SL1" corresponds to an area of a surface portion of the left-hand valve surface 531, which is surrounded by an outer peripheral boundary line of the first valve seat 522 when viewed the left-hand valve surface 531 from the left-hand side. In other words, the pressure receiving area "SL1" corresponds to an area formed on the right-hand valve surface 532 and surrounded by an outer periphery of the first valve seat 522, when the first valve member 53 is in contact with the first valve seat 522 of the intermediate member 52. The pressure receiving area "SH1" corresponds to an area of a surface portion of the right-hand valve surface 532, which is surrounded by an inner peripheral boundary line of the first valve seat 522 when the first valve member 53 is in contact with the first valve seat 522.

Accordingly, when the first valve member 53 is separated from the first valve seat 522, the fuel flows in the forward direction from the upstream-side fuel passage 513 to the downstream-side fuel passage 255 through the notched portions 543 (the second grooves 543) of the first valve holder 541, as indicated by two-dot-chain lines L31 in FIG. 3.

In addition, the above first equation (1) can be converted into the following equation (1a). Therefore, it can be so re-worded that the first valve member 53 is separated from the first valve seat 522, when the fuel pressure "PL" in the upstream-side fuel passage 513 becomes higher than a first predetermined value "$(PH \cdot SL1 + F1)/SH1$".

$$(PH \cdot SL1 + F1)/SH1 < PL \qquad (1a)$$

In addition, according to the valve device 50, a condition for the fuel flow in the reverse direction from the downstream-side fuel passage 255 to the upstream-side fuel passage 513 is decided based on the fuel pressure in the upstream-side fuel passage 513, the fuel pressure in the downstream-side fuel passage 255, a biasing force of the second spring 56 and pressure receiving areas on the left-hand and the right-hand valve surfaces 551 and 552 of the second valve member 55.

More exactly, the second valve member 55 is separated from the second valve seat 523 of the intermediate member 52, when the following second equation (2) is satisfied:

$$PH \cdot (S2 - SL2) > PL \cdot (S2 - SH2) + F2 \qquad (2)$$

In the above equation (2), "F2" is the biasing force of the second spring 56; "S2" is an area formed on a plane of the right-hand valve surface 552 (or the left-hand valve surface 551) of the second valve member 55 and surrounded by an outer periphery of the second valve member 55; "SL2" is an area formed on a plane of the left-hand valve surface 551 and surrounded by an outer periphery of the intermediate member 52 (including the notched portions 524), when the second valve member 55 is in contact with the second valve seat 523 of the intermediate member 52; and "SH2" is an area formed on the plane of the left-hand valve surface 551 (or the right-hand valve surface 552) and surrounded by an inner periphery of the second valve seat 523, when the second valve member 55 is in contact with the second valve seat 523 of the intermediate member 52.

Therefore, "S2−SL2" is a pressure receiving area formed on the left-hand valve surface 551 of the second valve member 55 and receiving the fuel pressure "PH" of the downstream-side fuel passage 255 in the right-hand direction, when the second valve member 55 is in contact with the second valve seat 523 of the intermediate member 52. "S2−SH2" is a pressure receiving area formed on the right-hand valve surface 552 of the second valve member 55 and receiving the fuel pressure "PL" of the upstream-side fuel passage 513 in the left-hand direction.

Accordingly, when the second valve member 55 is separated from the second valve seat 523, the fuel flows in the reverse direction from the downstream-side fuel passage 255 to the upstream-side fuel passage 513 through the notched portions 543 of the first valve holder 541 and the notched portions 524 of the intermediate member 52, as indicated by two-dot-chain lines L32 in FIG. 3.

In addition, the above second equation (2) can be converted into the following equation (2a). Therefore, it can be so re-worded that the second valve member 55 is separated from the second valve seat 523, when the fuel pressure "PH" in the downstream-side fuel passage 255 becomes higher than a second predetermined value "$\{PL \cdot (S2 - SH2) + F2)\}/(S2 - SL2)$".

$$PH > \{PL \cdot (S2 - SH2) + F2)\}/(S2 - SL2) \qquad (2a)$$

An operation of the high-pressure pump 20 will be hereinafter explained. The high-pressure pump 20 carries out a pumping cycle so as to pressurize and pump out the fuel, wherein the pumping cycle includes a suction stroke, a fuel-amount adjusting stroke and a discharge stroke.

In the suction stroke, the fuel is sucked into the fuel pressurizing chamber 27.

More exactly, when the plunger 31 is moved in a downward direction from its top dead center to a bottom dead center in accordance with a rotation of a cam shaft (not shown) having the cam member 15, the volume of the fuel pressurizing chamber 27 is increased and the pressure in the fuel pressurizing chamber 27 is thereby decreased. Then, the discharge valve portion 45 is closed. On the other hand, the intake valve 39 is moved in the right-hand direction by a difference pressure between the fuel pressurizing chamber 27 and the fuel supply chamber 36 and the biasing force of the spring 421 against the biasing force of the spring 373, so that the intake valve portion 35 is opened.

Since the electric power is not yet supplied to the coil 411 in the suction stroke, the movable core 43 as well as the needle 431 moving together with the movable core 43 is moved in the direction to the fuel pressurizing chamber 27 (in the right-hand direction) by the biasing force of the spring 421. The needle 431 is in contact with the intake valve 39 so as to keep a valve opened condition of the intake valve 39. As a result, the fuel flows into the fuel pressurizing chamber 27 from the fuel supply chamber 36.

When the fuel is sucked into the fuel pressurizing chamber 27 from the fuel supply chamber 36, the fuel pressure in the downstream-side fuel passage 255, which is communicated to the main fuel chamber 28, is decreased. According to the valve device 50, when the above first equation (1) is satisfied for the fuel pressure in the downstream-side fuel passage 255 and the fuel pressure in the upstream-side fuel passage 513, the first valve member 53 is separated from the first valve seat 522, so that the fuel flows into the main fuel chamber 28 from the upstream-side fuel passage 513 and the connecting passage 111. In addition, since the volume of the sub fuel chamber 271 is decreased because of the downward movement of the plunger 31, the fuel in the sub fuel chamber 271 is pushed out into the main fuel chamber 28 through the communication fuel passage (not shown).

In the fuel-amount adjusting stroke, which is carried out after the suction stroke, the amount of the fuel sucked into the fuel pressurizing chamber 27 is adjusted.

More exactly, when the plunger 31 is moved in an upward direction from the bottom dead center to the top dead center in accordance with the rotation of the cam shaft, the volume of the fuel pressurizing chamber 27 is decreased. Since the electric power is not yet supplied to the coil 411 until a predetermined timing, the needle 431 and the intake valve 39 are maintained by the biasing force of the spring 421 at the position on the side to the fuel pressurizing chamber 27. In other words, since the fuel supply chamber 36 is continuously communicated to the fuel pressurizing chamber 27, a part of the fuel sucked into the fuel pressurizing chamber 27 is pushed out therefrom and back into the fuel supply chamber 36 in accordance with the upward movement of the plunger 31. Therefore, the fuel pressure in the fuel pressurizing chamber 27 is not increased. The part of the fuel pushed back into the fuel supply chamber 36 is then returned to the main fuel chamber 28, the downstream-side fuel passage 255 and the sub fuel chamber 271.

In the discharge stroke, which is carried out after the fuel-amount adjusting stroke, the fuel is pressurized and the high-pressure fuel is discharged into the high-pressure connecting pipe 14.

More exactly, the electric power is supplied to the coil 411 at the predetermined timing during a period in which the plunger 31 is moved in the upward direction from the bottom dead center to the top dead center. When the electric power is supplied to the coil 411, a magnetic attracting force is generated between the fixed core 42 and the movable core 43 due to a magnetic field produced by the coil 411. When the magnetic attracting force becomes larger than the difference force between the biasing force of the spring 421 and the biasing force of the spring 373, the movable core 43 as well as the needle 431 is moved in the direction to the fixed core 42. As a result, the pushing force to the intake valve 39 is released. The intake valve 39 is thereby moved in the direction to the seat portion 38 by not only the biasing force of the spring 373 but also a force generated by the fuel flow pushed out from the fuel pressurizing chamber 27 into the main fuel chamber 28. Therefore, the intake valve 39 is finally brought into contact with the seat portion 38 and thereby the fuel pressurizing chamber 27 is closed.

The fuel pressure in the fuel pressurizing chamber 27 is further increased as the plunger 31 is moved toward the top dead center from a timing at which the intake valve 39 is brought into contact with the seat portion 38. The discharge valve portion 45 is opened, when the fuel pressure in the fuel pressurizing chamber 27 becomes higher than a predetermined value. As a result, the fuel pressurized by the fuel pressurizing chamber 27 is discharged via the discharge valve portion 45.

The supply of the electric power to the coil 411 is thereafter cut off at a predetermined timing during the discharge stroke. Since the fuel pressure of the fuel pressurizing chamber 27 applied to the intake valve 39 is larger than the biasing force of the spring 421, a valve closed condition of the intake valve 39 is maintained even after the cut-off of the electric power to the coil 411.

The inventors of the present disclosure looked into a change of the fuel pressure during the operation of the high-pressure pump 20 based on experiments. Experimental results are shown in FIGS. 6 and 7.

Figure 6:
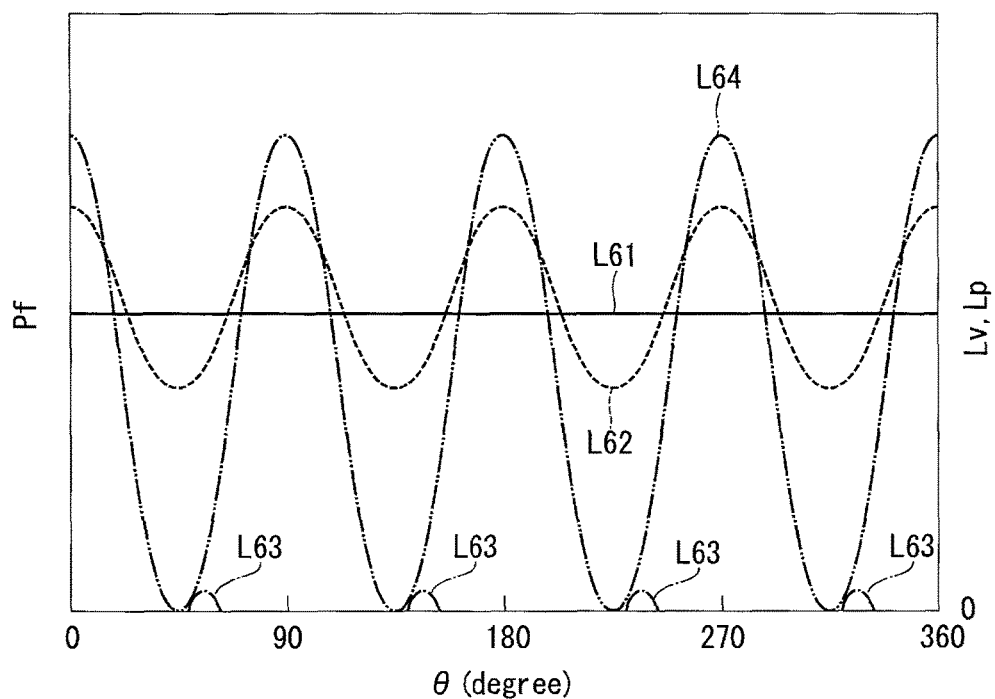
FIG. 6 shows characteristic curves of fuel pressure change with respect to a cam angle in the fuel supply system of the first embodiment, in a case that all of fuel sucked into a fuel pressurizing chamber is pushed out back into a fuel supply chamber.
Figure 7:
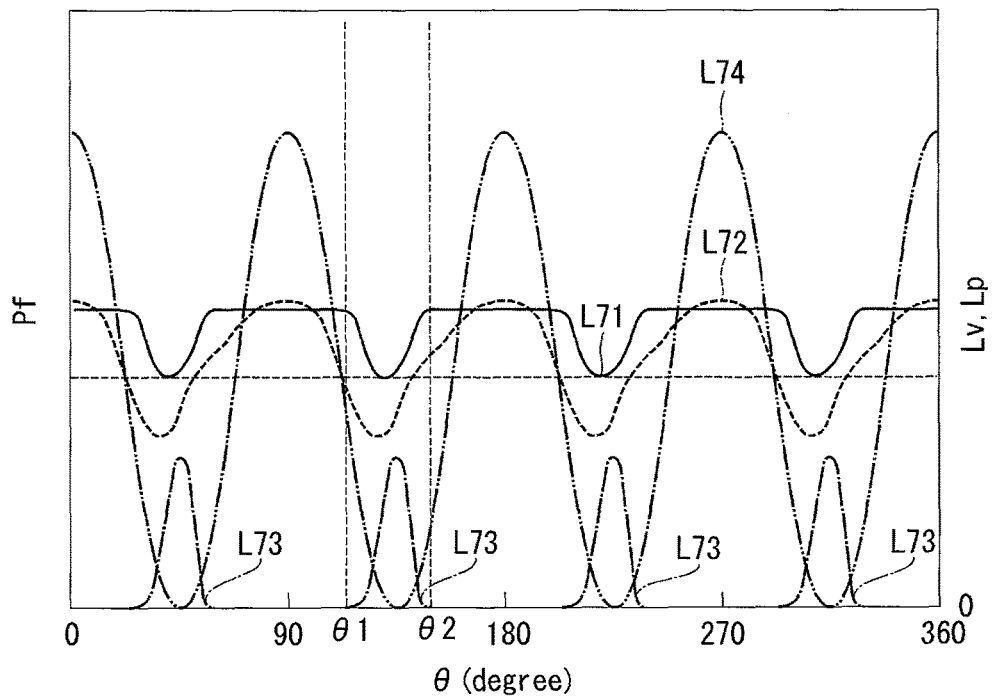
FIG. 7 shows characteristic curves of the fuel pressure change with respect to the cam angle in the fuel supply system of the first embodiment, in a case that all of the fuel sucked into the fuel pressurizing chamber is pumped out to a high-pressure fuel rail.

FIG. 6 shows the fuel pressure in the upstream-side fuel passage 513, the fuel pressure in the downstream-side fuel passage 255 and a lift amount of the first valve member 53, in a case that all of the fuel sucked into the fuel pressurizing chamber 27 is pushed out back to the fuel supply chamber 36 and then to the downstream-side fuel passage 255 during the fuel-amount adjusting stroke. In FIG. 6, a solid line L61 indicates the fuel pressure in the upstream-side fuel passage 513, a dotted line L62 indicates the fuel pressure in the downstream-side fuel passage 255 and a one-dot-chain line L63 indicates the lift amount of the first valve member 53. In FIG. 6, a two-dot-chain line L64 indicates a lift amount of the plunger 31 with respect to a cam angle "θ". In FIG. 6, a horizontal axis shows the cam angle "θ" of the cam member 15, a first axis of a vertical axis shows the fuel pressure "Pf" in the upstream-side fuel passage 513 or in the downstream-side fuel passage 255, and a second axis of the vertical axis shows the lift amount "Lv" of the first valve member 53 and the lift amount "Lp" of the plunger 31, wherein a level on the horizontal axis indicates zero. In FIG. 6, the lift amount "Lp" of the plunger 31 is indicated by a distance of the plunger 31 from a reference point (at which the lift amount is zero) in a direction that the volume of the fuel pressurizing chamber 27 is decreased. The position of the plunger 31, at which the volume of the fuel pressurizing chamber 27 is maximized (that is, the bottom dead center), is treated as the reference point.

As shown in FIG. 6, in the case that all of the fuel sucked into the fuel pressurizing chamber 27 is pushed out back to the downstream-side fuel passage 255, the fuel pressure in the downstream-side fuel passage 255 (the dotted line L62) varies in accordance with the reciprocal movement of the plunger 31 (the two-dot-chain line L64). More exactly, when the plunger 31 is moved from the top dead center to the bottom dead center, for example, between the cam angle of 90 degrees and the cam angle of 135 degrees, the fuel pressure in the downstream-side fuel passage 255 becomes lower, since the fuel pressure in the fuel pressurizing chamber 27 is decreased and the fuel is sucked into the fuel pressurizing chamber 27 from the fuel supply chamber 36, that is, from the downstream-side fuel passage 255. On the other hand, when the plunger 31 is moved from the bottom dead center to the top dead center, for example, between the cam angle of 135 degrees and the cam angle of 180 degrees, the fuel pressure in the downstream-side fuel passage 255 becomes higher, since the fuel pressure in the fuel pressurizing chamber 27 is increased and thereby the fuel is pushed out from the fuel pressurizing chamber 27 back into the fuel supply chamber 36, that is, to the downstream-side fuel passage 255.

The fuel pressure in the downstream-side fuel passage 255 and the fuel pressure in the upstream-side fuel passage 513 may temporarily satisfy the above first equation (1) during the above operation. Then, the first valve member 53 may be slightly separated from the first valve seat 522, as indicated by the one-dot-chain line L63. However, since the fuel hardly flows from the upstream-side fuel passage 513 to the downstream-side fuel passage 255, the fuel pressure in the upstream-side fuel passage 513 is stable, as indicated by the solid line L61. As a result, in the fuel supply system 1 of the present embodiment, it is possible to stably inject the fuel from the low-pressure fuel injectors 9, even when the plunger 31 of the high-pressure pump 20 is reciprocated without pumping operation.

FIG. 7 shows the fuel pressure in the upstream-side fuel passage 513, the fuel pressure in the downstream-side fuel passage 255 and the lift amount of the first valve member 53, in a case that all of the fuel sucked into the fuel pressurizing chamber 27 is pressurized and discharged to the high-pressure fuel rail 6 during the fuel-amount adjusting stroke and the discharge stroke of the high-pressure pump 20. In FIG. 7, a solid line L71 indicates the fuel pressure in the upstream-side fuel passage 513, a dotted line L72 indicates the fuel pressure in the downstream-side fuel passage 255 and a one-dot-chain line L73 indicates the lift amount of the first valve member 53. In FIG. 7, a two-dot-chain line L74 indicates the lift amount of the plunger 31 with respect to the cam angle "θ". In FIG. 7, in a similar manner to FIG. 6, a horizontal axis shows the cam angle "θ" of the cam member 15, a first axis of a vertical axis shows the fuel pressure "Pf" in the upstream-side fuel passage 513 or in the downstream-side fuel passage 255, and a second axis of the vertical axis shows the lift amount "Lv" of the first valve member 53 and the lift amount "Lp" of the plunger 31, wherein a level on the horizontal axis indicates zero. In FIG. 7, the lift amount "Lp" of the plunger 31 is indicated by the distance of the plunger 31 from the reference point (at which the lift amount is zero) in the direction that the volume of the fuel pressurizing chamber 27 is decreased. The position of the plunger 31, at which the volume of the fuel pressurizing chamber 27 is maximized (the bottom dead center), is treated as the reference point.

As shown in FIG. 7, in the case that all of the fuel sucked into the fuel pressurizing chamber 27 is discharged into the high-pressure fuel rail 6, the fuel pressure in the downstream-side fuel passage 255 (the dotted line L72) likewise varies in accordance with the reciprocal movement of the plunger 31 (the two-dot-chain line L74). Since all of the fuel sucked into the fuel pressurizing chamber 27 is discharged into the high-pressure fuel rail 6, the amount of the fuel to be returned from the fuel pressurizing chamber 27 to the downstream-side fuel passage 255 is zero. Therefore, the fuel pressure in the downstream-side fuel passage 255 becomes relatively low.

As a result, the first valve member 53 is separated from the first valve seat 522 at a cam angle of "θ1" in FIG. 7, as indicated by the one-dot-chain line L73. Then, the fuel flows from the upstream-side fuel passage 513 to the downstream-side fuel passage 255, so that the fuel is sucked into the fuel pressurizing chamber 27 through the fuel supply chamber 36. The fuel pressure in the upstream-side fuel passage 513 is thereby decreased, as indicated by the solid line L71.

When a certain amount of the fuel flows from the upstream-side fuel passage 513 to the downstream-side fuel passage 255 and then the plunger 31 is moved in the upward direction, the fuel pressure in the downstream-side fuel passage 255 is increased. Then, the first valve member 53 is brought into contact with the first valve seat 522 at a cam angle of "θ2". The fuel flow from the upstream-side fuel passage 513 to the downstream-side fuel passage 255 is thereby stopped. As a result, the fuel pressure in the upstream-side fuel passage 513 is not changed thereafter, even when the fuel pressure in the downstream-side fuel passage 255 is changed.

According to the fuel supply system 1, in the case that all of the fuel sucked into the fuel pressurizing chamber 27 is discharged into the high-pressure fuel rail 6, the fuel in the connecting passage 111 is injected into the combustion chambers of the engine from the low-pressure fuel injectors 9 during the cam angle, in which the fuel pressure in the upstream-side fuel passage 513 becomes stable in FIG. 7 (after the cam angle of "θ2"). As a result, it becomes possible to stably inject the fuel from the low-pressure fuel injectors 9.

When any trouble occurs in the high-pressure fuel injectors 7 and/or in the high-pressure fuel rail 6, the pressurized fuel may remain inside of the high-pressure pump 20 and thereby the fuel pressure in the high-pressure pump 20 may be increased. In such a case, the second valve member 55 is separated from the second valve seat 523 in the valve device 50, when the fuel pressure in the downstream-side fuel passage 255 and the fuel pressure in the upstream-side fuel passage 513 satisfy the second equation (2). Then, the fuel flows in the reverse direction from the downstream-side fuel passage 255 to the upstream-side fuel passage 513.

The fuel supply system 1 of the present embodiment has the following advantages:

(a) In the high-pressure pump 20, the part of the fuel sucked into the fuel pressurizing chamber 27 is pushed back to the main fuel chamber 28 or all of the fuel sucked into the fuel pressurizing chamber 27 is discharged into the high-pressure fuel rail 6, depending on the amount of the fuel to be injected into the combustion chambers of the engine from the high-pressure fuel injectors 7. In the above operation, the fuel pressure varies relatively largely in the main fuel chamber 28 and in the downstream-side fuel passage 255 connected to the main fuel chamber 28.

The valve device 50 blocks off the communication between the upstream-side fuel passage 513 (which is connected to the connecting passage 111) and the downstream-side fuel passage 255, depending on the relationship between the fuel pressure in the upstream-side fuel passage 513 (that is, the fuel pressure in the connecting passage 111) and the fuel pressure in the downstream-side fuel passage 255. As a result, the variation of the fuel pressure in the connecting passage 111 becomes smaller and thereby it becomes possible to decrease the vibration to be caused by the pulsation of the fuel pressure. It is, therefore, possible to prevent a possible breakage of the high-pressure pump 20 due to the vibration.

(b) The part of the fuel flowing through the connecting passage 111 is supplied to the low-pressure fuel injectors 9 via the branch-off portion 12 of the connecting pipe 11. Since the pressure variation of the fuel in the high-pressure pump 20 does not have an influence to the pressure of the fuel flowing through the connecting passage 111, it is possible to stabilize fuel injection pressure for the low-pressure fuel injectors 9. Accordingly, it is possible to exactly inject the required amount of the fuel from the low-pressure fuel injectors 9.

(c) In addition, when the fuel pressure in the downstream-side fuel passage 255 and the fuel pressure in the upstream-side fuel passage 513 satisfy the second equation (2), the second valve member 55 is separated from the second valve seat 523, so that the fuel flows in the reverse direction from the downstream-side fuel passage 255 to the upstream-side fuel passage 513. According to the above operation, even when the fuel of the relatively high pressure remains inside of the high-pressure pump 20 due to, for example, any malfunction or trouble of the high-pressure fuel injectors 7, the second valve member 55 is separated from the second valve seat 523 in order that the high-pressure fuel is returned to the upstream-side fuel passage 513. Accordingly, it is possible to prevent the possible breakage of the high-pressure pump 20.

(d) In the valve device of the fuel supply system according to the prior art, as disclosed in the above mentioned Japanese Patent Publication No. 2006-504903 (=WO 2004/040127), the first spring and the second spring are so arranged to be overlapped with each other in the radial direction of the valve device. The valve device allows the fuel flow in the forward direction, while the valve device works as a check valve for allowing the fuel flow in the reverse direction depending on a relationship of fuel pressures at both sides of the valve device. However, a size of the valve device of this prior art may become larger in its radial direction.

According to the valve device 50 of the present embodiment, however, the right-hand valve surface 532 of the first valve member 53 and the left-hand valve surface 551 of the second valve member 55 are arranged at such positions opposing to each other in the direction of the center axis CA50. In addition, the first spring 54 and the second spring 56 are located at such positions separated from each other in the direction of the center axis CA50 of the valve device 50. Accordingly, it is possible to reduce the size of the valve device 50 in the radial direction.

(e) In addition, in the valve device of the fuel supply system according to the prior art, as disclosed in the above mentioned Japanese Patent Publication No. 2006-504903, the first valve member and the first spring for biasing the first valve member in the direction to the connecting pipe are provided in the valve housing for allowing the fuel flow in the forward direction. And the second valve member and the second spring for biasing the second valve member in the direction to the low-pressure accumulator are also provided in the valve housing for allowing the fuel flow in the reverse direction. The position of the second valve member and the second spring is on a side closer to the connecting pipe, compared with the position of the first valve member and the first spring. According to such a structure, the fuel in the forward direction as well as the fuel in the reverse direction strikes against an inner wall of the valve housing and thereby pressure loss of the fuel may be increased.

On the other hand, according to the valve device 50 of the present embodiment, the first valve seat 522 and the second valve seat 523 are respectively formed on the first and the second peripheral side portions of the intermediate member 52. And the first valve member 53 and the second valve member 55 are so provided as to sandwich the intermediate member 52 between them. According to the above structure, a number of strikes of the fuel flows in the forward direction and/or in the reverse direction, which strike against the inner walls of the valve housing 51, the first valve holder 541 and so on, becomes relatively smaller. It is, therefore, possible to decrease pressure loss of the fuel.

(f) In addition, since the intermediate member 52 of the present embodiment is formed in the almost cylindrical shape and the first valve member 53 and the second valve member 55 are respectively brought into contact with the first and the second valve seats 522 and 523 formed at each of axial ends of the intermediate member 52, the structure of the valve device is simpler than that of the above prior art (JP 2006-504903), in which the second valve seat for the second valve member is formed in the first valve member.

(g) In the present embodiment, the notched portions 524 and 543, through which the fuel flows in the reverse direction, are formed in the intermediate member 52 and the first valve holder 541. Since it is not necessary to provide specific fuel passages for the fuel flow of the reverse direction, it is possible to reduce the size of the valve device 50 in its radial direction.

Second Embodiment

A valve device according to a second embodiment of the present disclosure will be explained with reference to FIG. 8. The second embodiment is different from the first embodiment in the shapes and sizes of the first and the second valve members.

A check valve portion 60 (hereinafter, the valve device 60) is composed of a valve housing 61, an intermediate member 62, a first valve member 63 (a forward-flow allowing unit), a first spring 64, a second valve member 65 (a reverse-flow allowing unit), a second spring 66, a first filter 67, a second filter 68 and so on.

The valve housing 61 is made of metal and formed in an almost cylindrical shape. A left-hand end portion 611 (hereinafter, a downstream-side passage portion) of the valve housing 61 is fixed to the inner wall 256 (FIG. 2) of the downstream-side fuel passage 255 formed in the pump body 25, for example, by the press-fitting process. The valve housing 61 has a through-hole extending in a direction of a center axis CA60. An inner diameter of the through-hole formed in the downstream-side passage portion 611 is larger than an inner diameter of the through-hole formed in a right-hand side end portion 612 (hereinafter, an upstream-side passage portion). The intermediate member 62, the first valve member 63, the first spring 64 (the first biasing member), the second valve member 65, the second spring 66 (the second biasing member), the first filter 67, the second filter 68 and so on are accommodated in the downstream-side passage portion 611 of the valve housing 61. The upstream-side passage portion 612 is connected to the connecting pipe 11. An upstream-side fuel passage 613, which is communicated to the fuel passage 111 of the connecting pipe 11, is formed in the inside of the upstream-side passage portion 612.

The intermediate member 62 is formed in an almost cylindrical shape and fixed to an inner wall 614 of the through-hole formed in the downstream-side passage portion 611 of the valve housing 61. The intermediate member 62 has a first passage portion 621 extending in the direction of the center axis CA60. The intermediate member 62 has a first and a second peripheral side portions at both axial ends thereof, each surrounding each of opening ends of the first passage portion 621. A first valve seat 622, which the first valve member 63 is operatively brought into contact with or separated from, is formed at the first peripheral side portion of the intermediate member 62 (on a left-hand axial end). A second valve seat 623, which the second valve member 65 is operatively brought into contact with or separated from, is formed at the second peripheral side portion of the intermediate member 62 (on a right-hand axial end).

The intermediate member 62 has multiple (for example, four) notched portions 624 (also referred to as the first grooves) at a radial outer periphery, like the first embodiment. Each of radial outer peripheral portions of the intermediate member 62, at which the notched portions 624 are not formed, is in contact with the inner wall 614 of the valve housing 61. A gap is formed between each of the notched portions 624 and the inner wall 614. The fuel passes through the gaps when the fuel flows in a forward direction from the upstream-side fuel passage 613 and the connecting passage 111, which is formed on a right-hand side of the valve housing 61, to the downstream-side fuel passage 255, which is formed on a left-hand side of the valve housing 61.

The first valve member 63 is formed in a ring shape. The first valve member 63 has a third passage portion 630 extending in the direction of the center axis CA60. The first valve member 63 is arranged on a side of the first peripheral side portion of the intermediate member 62 (that is, on the left-hand axial end of the intermediate member 62 facing to the downstream-side fuel passage 255). The first valve member 63 is movably accommodated in a first valve holder 641 of the valve housing 61, so that the first valve member 63 is reciprocal with respect to the first valve holder 641 fixed to the inner wall 614 of the valve housing 61. A right-hand end of the first spring 64 is in contact with a left-hand valve surface 631 of the first valve member 63. A right-hand valve surface 632 of the first valve member 63 is operatively brought into contact with or separated from the first valve seat 622 of the intermediate member 62. An outer diameter of the first valve member 63 is larger than that of the second valve member 65. The right-hand valve surface 632 is also referred to as "the upstream-side valve surface".

A left-hand end of the first spring 64 is in contact with a filter stopper 642, which is accommodated in a left-hand end portion 644 of the first valve holder 641 on a side opposite to the intermediate member 62. As already explained above, the right-hand end of the first spring 64 is in contact with the left-hand valve surface 631 of the first valve member 63. The first spring 64 biases the first valve member 63 in a right-hand direction, that is, in a valve closing direction of the first valve member 63, so that the first valve member 63 is brought into contact with the first valve seat 622 of the intermediate member 62.

The first valve holder 641 is formed in a cylindrical shape. A stepped portion 643 is formed in a right-hand end portion of the first valve holder 641 on a side to the intermediate member 62. The stepped portion 643 restricts a movement of the first valve member 63 in a left-hand direction, that is, in a direction toward the downstream-side fuel passage 255. The first valve holder 641 guides the reciprocal movement of the first valve member 63 as well as expansion and contraction of the first spring 64.

The second valve member 65 is formed in a disc shape and arranged on a side of the second peripheral side portion of the intermediate member 62 (that is, on the right-hand axial end of the intermediate member 62 facing to the upstream-side fuel passage 613). The second valve member 65 is movably accommodated in the valve housing 61, more exactly, in a second valve holder 661 fixed to the inner wall 614 of the valve housing 61, so that the second valve member 65 is reciprocal with respect to the second valve holder 661. A left-hand valve surface 651 of the second valve member 65 is operatively brought into contact with or separated from the second valve seat 623. A left-hand end of the second spring 66 is in contact with the a right-hand valve surface 652 of the second valve member 65.

The second spring 66 is provided in the second valve holder 661. As explained above, the left-hand end of the second spring 66 is in contact with the right-hand valve surface 652 of the second valve member 65. A right-hand end of the second spring 66 is in contact with the second valve holder 661. The second spring 66 biases the second valve member 65 in a left-hand direction, that is, in a valve closing direction of the second valve member 65, so that the second valve member 65 is pushed to the second valve seat 623 of the intermediate member 62.

The second valve holder 661 is formed in a cylindrical shape. The second filter 68 is arranged between a right-hand end portion 665 of the second valve holder 661 and the inner wall 614 of the valve housing 61.

Multiple notched portions 663 are formed in a left-hand end portion of the second valve holder 661 on a side to the intermediate member 62. More exactly, the four notched portions 663 (also referred to as the second grooves) are formed in the left-hand end portion of the second valve holder 661 at equal intervals in a circumferential direction of the second valve holder 661. When the second valve holder 661 and the intermediate member 62 are assembled in the valve housing 61, each of the notched portions 663 (each second groove 663) and each of the notched portions 624 (each first groove 624) of the intermediate member 62 are aligned with each other in a direction parallel to the center axis CA60. A gap formed between each of the notched portions 663 and the inner wall 614 of the valve housing 61 and a space formed in each of the notched portions 663 form a fluid passage, through which the fuel passes when the fuel flows in the forward direction from the upstream-side fuel passage 613 to the downstream-side fuel passage 255 or in the reverse direction from the downstream-side fuel passage 255 to the upstream-side fuel passage 613.

Multiple (four) stepped portions 664 are formed in the left-hand end portion of the second valve holder 661 on the side to the intermediate member 62. The stepped portions 664 restrict a movement of the second valve member 65 in a right-hand direction, that is, in a direction toward the upstream-side fuel passage 613. The second valve holder 661 guides the reciprocal movement of the second valve member 65 as well as expansion and contraction of the second spring 66.

The first filter 67 is arranged between the left-hand end portion 644 of the first valve holder 641 and the filter stopper 642. The first filter 67 removes extraneous material contained in the fuel flowing through the valve device 60.

The second filter 68 is arranged between the valve housing 61 and the second valve holder 661. The second filter 68 likewise removes extraneous material contained in the fuel flowing through the valve device 60.

According to the valve device 60 of the present embodiment, a condition for the fuel flow in the forward direction from the upstream-side fuel passage 613 to the downstream-side fuel passage 255 is decided based on the fuel pressure in the upstream-side fuel passage 613, the fuel pressure in the downstream-side fuel passage 255, a biasing force of the first spring 64 and pressure receiving areas on the left-hand and the right-hand valve surfaces 631 and 632 of the first valve member 63.

More exactly, the first valve member 63 is separated from the first valve seat 622 of the intermediate member 62, when the following third equation (3) is satisfied:

$$PH \cdot (S3 - SH3) + F3 < PL \cdot (S3 - SL3) \qquad (3)$$

In the above equation (3), "PL" is the fuel pressure in the upstream-side fuel passage 613; "PH" is the fuel pressure in the downstream-side fuel passage 255; "F3" is the biasing force of the first spring 64; "S3" is an area formed on a plane of the left-hand valve surface 631 (or the right-hand valve surface 632) of the first valve member 63 and surrounded by an outer periphery of the first valve member 63; "SL3" is an area formed on a plane of the right-hand valve surface 632 and surrounded by an outer periphery of the intermediate member 62 (including the notched portions 624), when the first valve member 63 is in contact with the first valve seat 622 of the intermediate member 62; and "SH3" is an area formed on the plane of the right-hand valve surface 632 and surrounded by an inner periphery of the first valve seat 622, when the first valve member 63 is in contact with the first valve seat 622 of the intermediate member 62.

Therefore, "S3−SH3" is a pressure receiving area formed on the left-hand valve surface 631 of the first valve member 63 and receiving the fuel pressure "PH" of the downstream-side fuel passage 255 in the right-hand direction. "S3−SL3" is a pressure receiving area formed on the right-hand valve surface 632 of the first valve member 63 and receiving the fuel pressure "PL" of the upstream-side fuel passage 613 in the left-hand direction, when the first valve member 63 is in contact with the first valve seat 622 of the intermediate member 62.

Figure 8:
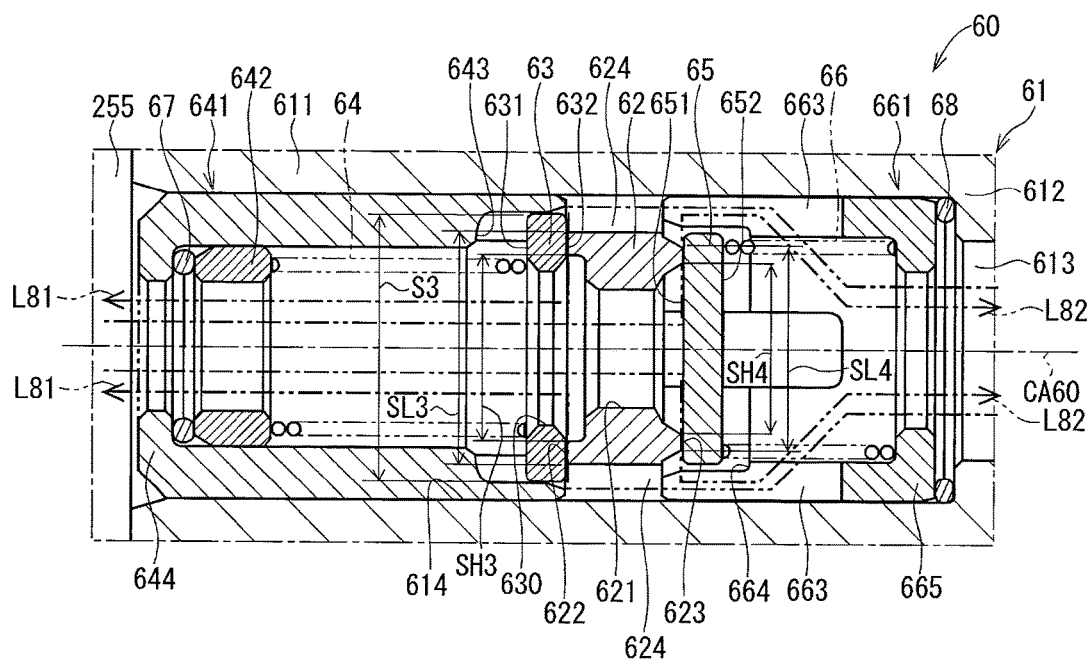
FIG. 8 is a schematically enlarged cross sectional view showing a valve device according to a second embodiment of the present disclosure.

Accordingly, when the first valve member 63 is separated from the first valve seat 622, the fuel flows in the forward direction from the upstream-side fuel passage 613 to the downstream-side fuel passage 255 through the notched portions 663 of the second valve holder 661 and the notched portions 624 of the intermediate member 62, as indicated by two-dot-chain lines L81 in FIG. 8.

In addition, the above first equation (3) can be converted into the following equation (3a). Therefore, it can be so re-worded that the first valve member 63 is separated from the first valve seat 622, when the fuel pressure "PL" in the upstream-side fuel passage 613 becomes higher than a first predetermined value "{(PH·(S3−SH3)+F3)/(S3−SL3)}".

$$\{(PH \cdot (S3-SH3)+F3)/(S3-SL3)\} < PL \tag{3a}$$

In addition, according to the valve device 60, a condition for the fuel flow in the reverse direction from the downstream-side fuel passage 255 to the upstream-side fuel passage 613 is decided based on the fuel pressure in the upstream-side fuel passage 613, the fuel pressure in the downstream-side fuel passage 255, a biasing force of the second spring 66 and pressure receiving areas on the left-hand and the right-hand valve surfaces 651 and 652 of the second valve member 65.

More exactly, the second valve member 65 is separated from the second valve seat 623 of the intermediate member 62, when the following fourth equation (4) is satisfied:

$$PH \cdot SH4 > PL \cdot SL4 + F4 \tag{4}$$

In the above equation (4), "F4" is the biasing force of the second spring 66; "SL4" is a pressure receiving area formed on the right-hand valve surface 652 of the second valve member 65, which receives the fuel pressure "PL" of the upstream-side fuel passage 613 in the left-hand direction; and "SH4" is a pressure receiving area formed on the left-hand valve surface 651 of the second valve member 65, which receives the fuel pressure "PH" of the downstream-side fuel passage 255 in the right-hand direction when the second valve member 65 is in contact with the second valve seat 623.

Namely, the pressure receiving area "SL4" corresponds to an area of a surface portion of the right-hand valve surface 652, which is surrounded by an outer peripheral boundary line of the second valve seat 623 when viewed the right-hand valve surface 652 from the right-hand side. In other words, the pressure receiving area "SL4" corresponds to an area formed on the left-hand valve surface 651 and surrounded by an outer periphery of the second valve seat 623, when the second valve member 65 is in contact with the second valve seat 623 of the intermediate member 62. The pressure receiving area "SH4" corresponds to an area of a surface portion of the left-hand valve surface 651, which is surrounded by an inner peripheral boundary line of the second valve seat 623 when the second valve member 65 is in contact with the second valve seat 623.

Accordingly, when the second valve member 65 is separated from the second valve seat 623, the fuel flows in the reverse direction from the downstream-side fuel passage 255 to the upstream-side fuel passage 613 through the notched portions 663 of the second valve holder 661, as indicated by two-dot-chain lines L82 in FIG. 8.

In addition, the above fourth equation (4) can be converted into the following equation (4a). Therefore, it can be so re-worded that the second valve member 65 is separated from the second valve seat 623, when the fuel pressure "PH" in the downstream-side fuel passage 255 becomes higher than a second predetermined value "(PL·SL4+F4)/SH4".

$$PH > (PL \cdot SL4 + F4)/SH4 \tag{4a}$$

According to the valve device 60 of the second embodiment, the fuel flow in the forward direction from the upstream-side fuel passage 613 to the downstream-side fuel passage 255 is allowed. In addition, the second valve member 65 is separated from the second valve seat 623, when the fuel pressures in the upstream-side and the downstream-side fuel passages 613 and 255 satisfy the above fourth equation (4). And thereby, the fuel flow in the reverse direction from the downstream-side fuel passage 255 to the upstream-side fuel passage 613 is allowed. Accordingly, the same advantages to the first embodiment can be obtained in the second embodiment.

In the valve device 60 of the second embodiment, the outer diameter of the first valve member 63 is larger than that of the second valve member 65. It is, thereby, possible to make the amount of the fuel flow in the forward direction from the upstream-side fuel passage 613 to the downstream-side fuel passage 255 larger than that in the reverse flow from the downstream-side fuel passage 255 to the upstream-side fuel passage 613.

Third Embodiment

A valve device according to a third embodiment of the present disclosure will be explained with reference to FIG. 9. The third embodiment is different from the first embodiment in the structure for allowing the fuel flow in the reverse direction.

A valve device 70 according to the third embodiment of the present disclosure is composed of a valve housing 71, an intermediate member 72, a first valve member 73 working as a part of a forward-flow allowing unit, a first spring 74, an orifice portion 75 working as a reverse-flow allowing unit as well as an orifice-forming member, a first filter 77, a second filter 78 and so on.

The valve housing 71 has a through-hole extending in a direction of a center axis CA70. The intermediate member 72, the first valve member 73, the first spring 74 (a first biasing member), the orifice portion 75, the first filter 77, the second filter 78 and so on are accommodated in the through-hole formed in a downstream-side passage portion 711 of the valve housing 71. An upstream-side fuel passage 713 communicated to the connecting passage 111 is formed in an upstream-side passage portion 712 of the valve housing 71.

The intermediate member 72 is formed in an almost cylindrical shape and is fixed to an inner wall 714 of the valve housing 71 on a side of the downstream-side passage portion 711. The intermediate member 72 has a first passage portion 721 extending in the direction of the center axis CA70. The first passage portion 721 has opening ends at its axial ends (a downstream-side and an upstream-side axial ends). A first valve seat 722 is formed on a first peripheral side portion of the intermediate member 72, more exactly, on a left-hand axial end of the intermediate member 72 surrounding the opening end of the first passage portion 721, which is communicated to the downstream-side fuel passage 255. The first valve member 73 is operatively brought into contact with or separated from the first valve seat 722. Notched portions corresponding to the notched portions 524 of the first embodiment are not formed in the intermediate member 72 of the present embodiment.

The first valve member 73 is formed in a disc shape. The first valve member 73 is arranged on a downstream side of the intermediate member 72, on which the downstream-side fuel passage 255 is formed. The first valve member 73 is movably accommodated in a first valve holder 741 fixed to the inner wall 714 of the valve housing 71, so that the first valve member 73 is capable of reciprocating with respect to the first valve holder 741. The orifice portion 75 is formed at a center of the first valve member 73, as explained below. A right-hand end of the first spring 74 is in contact with a left-hand valve surface 731 of the first valve member 73. A right-hand valve surface 732 of the first valve member 73 is operatively brought into contact with or separated from the first valve seat 722.

A left-hand end of the first spring 74 is in contact with a filter stopper 742, which is accommodated in a downstream-side end portion 745 of the first valve holder 741. The downstream-side end portion 745 is located on a side of the first valve holder 741 opposite to the intermediate member 72. Since the right-hand end of the first spring 74 is in contact with the left-hand valve surface 731 of the first valve member 73, the first spring 74 biases the first valve member 73 in a right-hand direction, that is, in a valve closing direction of the first valve member 73, so that the first valve member 73 is brought into contact with the first valve seat 722.

The first valve holder 741 is formed in an almost cylindrical shape. The first filter 77 and the filter stopper 742 are fixed to an inside of the downstream-side end portion 745 of the first valve holder 741. Multiple notched portions 743 are formed in a cylindrical wall of the first valve holder 741 on a side to the intermediate member 72, more exactly, in an upstream-side end portion of the cylindrical wall of the first valve holder 741. A gap is formed between the inner wall 714 of the valve housing 71 and each of the notched portions 743. The fuel passes through the above gaps and through spaces formed in the notched portions 743, when the fuel flows in the forward direction from the upstream-side fuel passage 713 to the downstream-side fuel passage 255. Multiple stepped portions 744 are formed in an inner peripheral surface of the cylindrical wall of the first valve holder 741, more exactly, in the upstream-side end portion of the first valve holder 741 on the side to the intermediate member 72. The stepped portions 744 restrict the movement of the first valve member 73 in the direction toward the downstream-side fuel passage 255. The first valve holder 741 guides the reciprocal movement of the first valve member 73 as well as expansion and contraction of the first spring 74.

The orifice portion 75 is formed at the center of the first valve member 73 on the center axis CA70 of the valve housing 71. The orifice portion 75 is integrally formed in the first valve member 73. The orifice portion 75 has an orifice 751 having a small diameter and extending in the direction of the center axis CA70. The orifice 751 communicates the first passage portion 721 formed in the intermediate member 72 to the downstream-side fuel passage 255.

The first filter 77 is arranged between the downstream-side end portion 745 of the first valve holder 741 (that is, the opposite side to the intermediate member 72) and the filter stopper 742. The second filter 78 is arranged between the valve housing 71 and the intermediate member 72. The first and the second filters 77 and 78 remove any extraneous materials contained in the fuel flowing through the valve device 70.

According to the valve device 70 of the present embodiment, a condition for the fuel flow in the forward direction from the upstream-side fuel passage 713 to the downstream-side fuel passage 255 is decided based on fuel pressure in the upstream-side fuel passage 713, fuel pressure in the downstream-side fuel passage 255, a biasing force of the first spring 74 and pressure receiving areas on the left-hand and the right-hand valve surfaces 731 and 732 of the first valve member 73.

More exactly, the first valve member 73 is separated from the first valve seat 722 of the intermediate member 72, when the following fifth equation (5) is satisfied:

$$PH \cdot SL5 + F5 < PL \cdot SH5 \tag{5}$$

In the above equation (5), "PL" is the fuel pressure in the upstream-side fuel passage 713; "PH" is the fuel pressure in the downstream-side fuel passage 255; "F5" is the biasing force of the first spring 74; "SL5" is a pressure receiving area formed on the left-hand valve surface 731 of the first valve member 73, which receives the fuel pressure "PH" of the downstream-side fuel passage 255 in the right-hand direction; and "SH5" is a pressure receiving area formed on the right-hand valve surface 732 of the first valve member 73, which receives the fuel pressure "PL" of the upstream-side fuel passage 713 in the left-hand direction when the first valve member 73 is in contact with the first valve seat 722.

Namely, the pressure receiving area "SL5" corresponds to an area of a surface portion of the left-hand valve surface 731, which is surrounded by an outer peripheral boundary line of the first valve seat 722 when viewed the left-hand valve surface 731 from the left-hand side. In other words, the pressure receiving area "SL5" corresponds to an area formed on the right-hand valve surface 732 and surrounded by an outer periphery of the first valve seat 722, when the first valve member 73 is in contact with the first valve seat 722 of the intermediate member 72. The pressure receiving area "SH5" corresponds to an area of a surface portion of the right-hand valve surface 732, which is surrounded by an inner peripheral boundary line of the first valve seat 722 when the first valve member 73 is in contact with the first valve seat 722.

Figure 9:
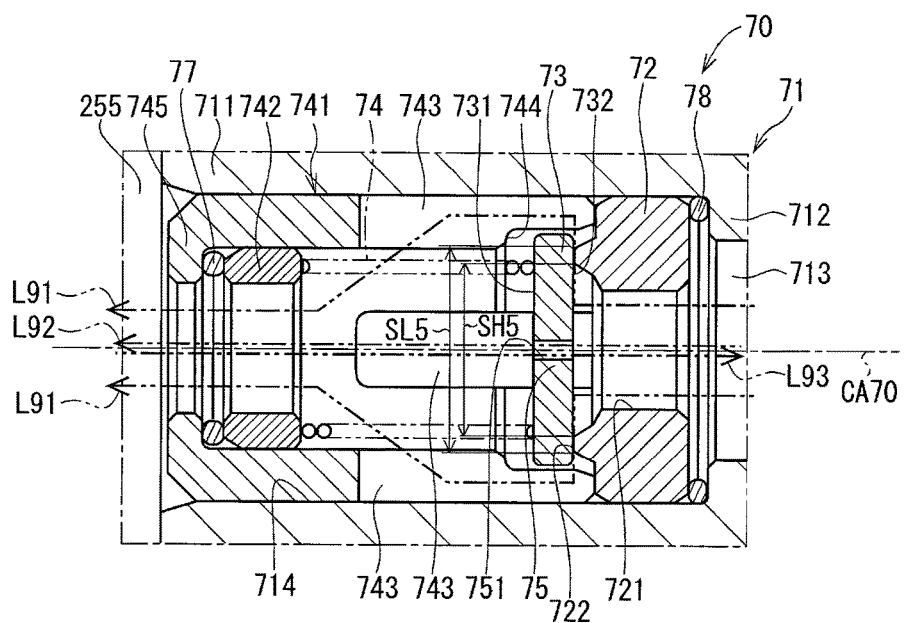
FIG. 9 is a schematically enlarged cross sectional view showing a valve device according to a third embodiment of the present disclosure.

Accordingly, when the first valve member 73 is separated from the first valve seat 722, the fuel flows in the forward direction from the upstream-side fuel passage 713 to the downstream-side fuel passage 255 through the notched portions 743 of the first valve holder 741, as indicated by two-dot-chain lines L91 in FIG. 9.

In addition, the above fifth equation (5) can be converted into the following equation (5a). Therefore, it can be so re-worded that the first valve member 73 is separated from the first valve seat 722, when the fuel pressure "PL" in the upstream-side fuel passage 713 becomes higher than a first predetermined value "(PH·SL5+F5)/SH5".

$$(PH·SL5+F5)/SH5<PL \tag{5a}$$

In addition, according to the valve device 70, when a small pressure difference is generated between the upstream-side fuel passage 713 and the downstream-side fuel passage 255, in other words, when a pressure difference between them becomes higher than a second predetermined value (for example, zero), the fuel of a relatively small amount flows through the orifice portion 75 in the forward direction from the upstream-side fuel passage 713 to the downstream-side fuel passage 255 (as indicated by a two-dot-chain line L92 in FIG. 9) or in the reverse direction from the downstream-side fuel passage 255 to the upstream-side fuel passage 713 (as indicated by a two-dot-chain line L93 in FIG. 9).

In the valve device 70 of the present embodiment, the orifice 751 having the small inner diameter is formed in the first valve member 73, through which the upstream-side fuel passage 713 and the downstream-side fuel passage 255 are communicated with each other. The fuel flow in the forward direction is allowed from the upstream-side fuel passage 713 to the downstream-side fuel passage 255, independently whether the first valve member 73 is in contact with or separated from the first valve seat 722, on one hand. On the other hand, the fuel flow in the reverse direction is allowed through the orifice 751 from the downstream-side fuel passage 255 to the upstream-side fuel passage 713 depending on the pressure difference. As a result, the same advantages to the first embodiment can be also obtained in the third embodiment.

Fourth Embodiment

A valve device according to a fourth embodiment of the present disclosure will be explained with reference to FIG. 10. The fourth embodiment is different from the third embodiment in the position of the orifice portion.

A valve device 80 according to the fourth embodiment of the present disclosure is composed of the valve housing 71, an intermediate member 82, a first valve member 83 working as a part of a forward-flow allowing unit, the first spring 74, an orifice portion 85 working as a reverse-flow allowing unit as well as an orifice-forming member, the first filter 77, the second filter 78 and so on.

The intermediate member 82 is formed in an almost cylindrical shape and is fixed to the inner wall 714 of the valve housing 71 on the side of the upstream-side passage portion 712. The intermediate member 82 has a first passage portion 821 extending in a direction of a center axis CA80. The first passage portion 821 has opening ends at its axial ends (a downstream-side and an upstream-side axial ends). A first valve seat 822 is formed on a first peripheral side portion of the intermediate member 82, more exactly, on a left-hand axial end of the intermediate member 82 surrounding the left-hand opening end of the first passage portion 821, which is communicated to the downstream-side fuel passage 255. The first valve member 83 is operatively brought into contact with or separated from the first valve seat 822. The orifice portion 85 is formed at a center of the intermediate member 82. More exactly, a part of the first passage portion 821 on the side to the upstream-side fuel passage 713 forms the orifice portion 85. Notched portions 824 are formed in the intermediate member 82 like the first or the second embodiment.

The first valve member 83 is formed in a ring shape. The first valve member 83 is arranged on a downstream-side of the intermediate member 82, on which the downstream-side fuel passage 255 is formed. The first valve member 83 is movably accommodated in the first valve holder 741 fixed to the inner wall 714 of the valve housing 71, so that the first valve member 83 is capable of reciprocating with respect to the first valve holder 741. The first valve member 83 has a third passage portion 830, which extends in the direction of the center axis CA80 and communicates the first passage portion 821 and the downstream-side fuel passage 255 with each other. The right-hand end of the first spring 74 is in contact with a left-hand valve surface 831 of the first valve member 83. A right-hand valve surface 832 of the first valve member 83 is operatively brought into contact with or separated from the first valve seat 822.

The orifice portion 85 is integrally formed in the intermediate member 82. The orifice portion 85 has an orifice 851 having a small diameter and extending in the direction of the center axis CA80. The orifice 851 communicates the first passage portion 821 to the upstream-side fuel passage 713.

According to the valve device 80 of the present embodiment, the first valve member 83 is separated from the first valve seat 822, when the following sixth equation (6) is satisfied:

$$PH·(S6-SH6)+F6<PL·(S6-SL6) \tag{6}$$

In the above equation (6), "PL" is the fuel pressure in the upstream-side fuel passage 713; "PH" is the fuel pressure in the downstream-side fuel passage 255; "F6" is a biasing force of the first spring 74; "S6" is an area formed on a plane of the left-hand valve surface 831 (or the right-hand valve surface 832) of the first valve member 83 and surrounded by an outer periphery of the first valve member 83; "SL6" is an area formed on a plane of the right-hand valve surface 832 and surrounded by an outer periphery of the intermediate member 82 (including the notched portions 824), when the first valve member 83 is in contact with the first valve seat 822 of the intermediate member 82; and "SH6" is an area formed on the plane of the right-hand valve surface 832 and surrounded by an inner periphery of the first valve seat 822, when the first valve member 83 is in contact with the first valve seat 822 of the intermediate member 82.

Therefore, "S6−SH6" is a pressure receiving area formed on the left-hand valve surface 831 of the first valve member 83 and receiving the fuel pressure "PH" of the downstream-side fuel passage 255 in the right-hand direction. "S6−SL6" is a pressure receiving area formed on the right-hand valve surface 832 of the first valve member 83 and receiving the fuel pressure "PL" of the upstream-side fuel passage 713 in the left-hand direction, when the first valve member 83 is in contact with the first valve seat 822 of the intermediate member 82.

Figure 10:
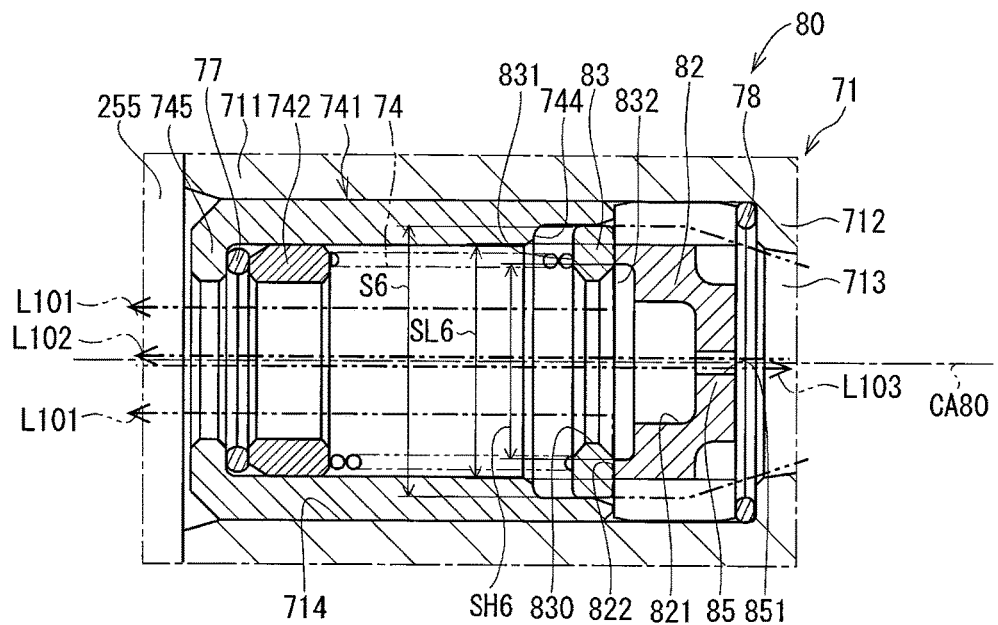
FIG. 10 is a schematically enlarged cross sectional view showing a valve device according to a fourth embodiment of the present disclosure.

Accordingly, when the first valve member 83 is separated from the first valve seat 822, the fuel flows in the forward direction from the upstream-side fuel passage 713 to the downstream-side fuel passage 255 through the notched portions 824 of the intermediate member 82, as indicated by two-dot-chain lines L101 in FIG. 10.

In addition, the above sixth equation (6) can be converted into the following equation (6a). Therefore, it can be so re-worded that the first valve member 83 is separated from the first valve seat 822, when the fuel pressure "PL" in the upstream-side fuel passage 713 becomes higher than a first predetermined value "{(PH·(S6−SH6)+F6)}/(S6−SL6)".

$$\{(PH \cdot (S6=SH6)+F6)\}/(S6=SL6) < PL \quad (6a)$$

In a similar manner to the third embodiment, when the pressure difference of a small value is generated in the valve device 80 of the fourth embodiment between the upstream-side fuel passage 713 and the downstream-side fuel passage 255, in other words, when the pressure difference between them becomes larger than a second predetermined value (for example, zero), the fuel of a relatively small amount flows through the orifice portion 85 in the forward direction from the upstream-side fuel passage 713 to the downstream-side fuel passage 255 (as indicated by a two-dot-chain line L102) or in the reverse direction from the downstream-side fuel passage 255 to the upstream-side fuel passage 713 (as indicated by a two-dot-chain line L103).

In the valve device 80 of the present embodiment, the orifice 851 having the small inner diameter is formed in the intermediate member 82, through which the upstream-side fuel passage 713 and the downstream-side fuel passage 255 are communicated with each other. As a result, on one hand, the fuel flow in the forward direction is allowed from the upstream-side fuel passage 713 to the downstream-side fuel passage 255, independently whether the first valve member 83 is in contact with or separated from the first valve seat 822. On the other hand, the fuel flow in the reverse direction is also allowed through the orifice portion 85 from the downstream-side fuel passage 255 to the upstream-side fuel passage 713 depending on the pressure difference. As a result, the same advantages to the first embodiment can be obtained in the fourth embodiment.

Other Embodiments and/or Modifications (M1) In the above embodiments, the valve device of the present disclosure is applied to the high-pressure pump for the fuel supply system. The technical field, in which the valve device of the present disclosure can be provided, is not limited to the above embodiments. The valve device may be applied to any other types of valve device, in which a fuel flow is allowed in a forward direction from an upstream-side to a downstream-side, while a fuel flow is allowed in a reverse direction from the downstream-side to the upstream-side when a fuel pressure in the downstream-side becomes higher than a fuel pressure in the upstream-side by a predetermined amount.

(M2) In the above embodiments, the first valve member is formed in the disc shape or the ring shape. However, the shape of the first valve member is not limited to those embodiments. The valve member may be formed in a flat plate of a polygonal shape, a ball shape or the like.

Figure 11:
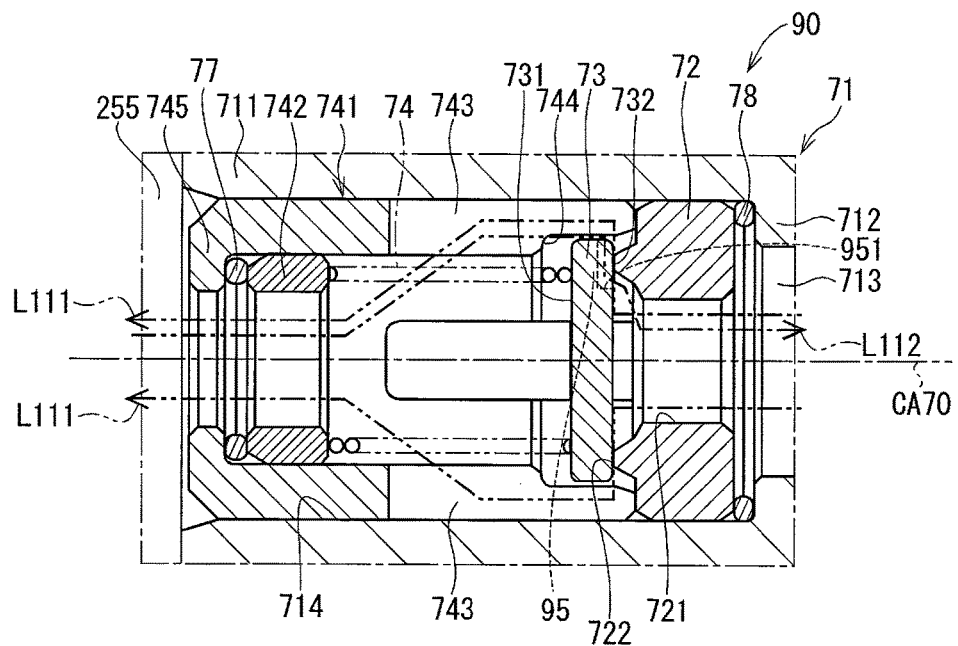
FIG. 11 is a schematically enlarged cross sectional view showing a valve device according to a further embodiment (a modification of the third embodiment) of the present disclosure.

(M3) In the above third embodiment, the orifice portion 75 is formed at the center of the first valve member 73. However, the position of the orifice portion is not limited to the center of the first valve member. FIG. 11 shows a valve device 90 according to a modification of the third embodiment.

An orifice portion 95 is formed at a portion of the right-hand valve surface 732 of the first valve member 73. More exactly, a radial-outwardly extending groove 951 is formed on the right-hand valve surface 732, which is operatively brought into contact with the first valve seat 722. The groove 951 forms a gap working as an orifice, when the first valve member 73 is in contact with the first valve seat 722.

The first valve member 73 is separated from the first valve seat 722, when the above fifth equation (5) is satisfied, so that the fuel flows in the forward direction from the upstream-side fuel passage 713 to the downstream-side fuel passage 255, as indicated by two-dot-chain lines L111 in FIG. 11.

On the other hand, the fuel flows in the reverse direction from the downstream-side fuel passage 255 to the upstream-side fuel passage 713 through the orifice portion 95 depending on the pressure difference, as indicated by a two-dot-chain line L112, even when the first valve member 73 is in contact with the first valve seat 722. As a result, the same advantages to the third embodiment can be obtained in this modification.

The present disclosure is not limited to the above embodiments and/or the modifications, but can be further modified in various manners without departing from a spirit of the present disclosure.

What is claimed is:

1. A valve device comprising:
a valve housing;
an intermediate member accommodated in the valve housing, an upstream-side fuel passage being formed at an upstream side of the intermediate member and a downstream-side fuel passage being formed at a downstream side of the intermediate member,
wherein the intermediate member is formed in a cylindrical shape having a central through-hole through which fuel flows from the upstream-side fuel passage to the downstream-side fuel passage, and
wherein the intermediate member has a first groove formed at a radial-outer periphery of the intermediate member and extending in a direction of a center axis of the valve housing so that the fuel flows from the downstream-side fuel passage to the upstream-side fuel passage through the first groove;
a forward-flow allowing unit provided inside of the valve housing on the downstream side of the intermediate member, the forward-flow allowing unit allowing a fuel flow in a forward direction from the upstream-side fuel passage to the downstream-side fuel passage when fuel pressure in the upstream-side fuel passage is higher than a first predetermined value; and
a reverse-flow allowing unit provided inside of the valve housing, the reverse-flow allowing unit allowing a fuel flow in a reverse direction from the downstream-side fuel passage to the upstream-side fuel passage when the fuel pressure in the downstream-side fuel passage is higher a second predetermined value,
wherein the forward-flow allowing unit includes;
a first valve member operatively brought into contact with or separated from a first valve seat formed in the intermediate member;
a first spring for biasing the first valve member in a valve closing direction of the first valve member toward the first valve seat,
a first valve holder configured to guide a reciprocal movement of the first valve member,
wherein the first valve holder has a second groove formed at a radial-outer periphery of the first valve holder and extending in the direction of the center axis of the valve housing so as to be in communication with the first groove of the intermediate member, and the second groove is communicated to the downstream-side fuel passage so that the fuel flows in the reverse direction through the second groove and the first groove, and
wherein the reverse-flow allowing unit is arranged on the upstream side of the intermediate member and includes:

a second valve member operatively brought into contact with or separated from a second valve seat formed in the intermediate member in order to open or close the first groove;

a second spring for biasing the second valve member in a valve closing direction of the second valve member toward the second valve seat, and a second valve holder having a cylindrical shape and provided in the valve housing, the second valve holder having a cylindrical accommodation space for movably accommodating the second valve member and guiding a reciprocal movement of the second valve member.

2. The valve device according to claim 1, wherein an upstream-side valve surface of the first valve member which is operatively brought into contact with the first valve seat and a downstream-side valve surface of the second valve member which is operatively brought into contact with the second valve seat are coaxially opposing to each other on the center axis of the valve housing.

3. The valve device according to claim 2, wherein the first valve seat is formed on a downstream-side axial end of the intermediate member.

4. The valve device according to claim 2, wherein the through-hole of the intermediate member is formed as a first passage portion extending in a direction of the center axis of the valve housing, the first valve member is formed in a flat plate shape and is operatively brought into contact with the first valve seat, which is formed on one of peripheral side portions of the intermediate member surrounding a downstream-side opening end of the first passage portion, and the second valve member is formed in a ring shape and is operatively brought into contact with the second valve seat, which is formed on the other of the peripheral side portions of the intermediate member surrounding an upstream-side opening end of the first passage portion.

5. A high-pressure pump comprising;

a plunger portion having a plunger;

a pump body having a fuel pressurizing chamber formed in a cylindrical shape, the plunger being movably accommodated in the fuel pressurizing chamber, a volume of the fuel pressurizing chamber being changed in accordance with a reciprocal movement of the plunger;

a pressure control portion provided between a fuel tank and the fuel pressurizing chamber for controlling pressure of fuel, which is supplied from the fuel tank into the fuel pressurizing chamber and pressurized in the fuel pressurizing chamber;

a discharge portion for discharging the fuel from the fuel pressurizing chamber to an outside of the high-pressure pump; and the valve device according to claim 1, wherein the valve device is provided between the fuel tank and the pressure control portion so that the downstream-side fuel passage of the valve device is communicated to the pressure control portion and the upstream-side fuel passage of the valve device is communicated to the fuel tank.

* * * * *